US012700700B2

(12) United States Patent
Tanaka et al.

(10) Patent No.: US 12,700,700 B2
(45) Date of Patent: Aug. 4, 2026

(54) CONNECTOR CABLE FOR REDUCING CROSSTALK

(71) Applicant: JAPAN AVIATION ELECTRONICS INDUSTRY, LIMITED, Tokyo (JP)

(72) Inventors: Yukitaka Tanaka, Tokyo (JP); Gota Kameyama, Tokyo (JP); Yukiko Sato, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 333 days.

(21) Appl. No.: 17/988,147

(22) Filed: Nov. 16, 2022

(65) Prior Publication Data

US 2023/0238743 A1 Jul. 27, 2023

(30) Foreign Application Priority Data

Jan. 24, 2022 (JP) ................................ 2022-008883

(51) Int. Cl.
*H01R 13/6471* (2011.01)
*H01R 9/05* (2006.01)
(Continued)

(52) U.S. Cl.
CPC ........... *H01R 13/6471* (2013.01); *H01R 9/05* (2013.01); *H01R 13/40* (2013.01); *H01R 13/502* (2013.01); *H01R 12/57* (2013.01)

(58) Field of Classification Search
CPC .... H01R 13/6471; H01R 24/28; H01R 24/30; H01R 24/60; H01R 13/65912; H01R 13/65914
See application file for complete search history.

(56) References Cited

U.S. PATENT DOCUMENTS 6,489,563 B1 12/2002 Zhao et al.
9,166,320 B1 * 10/2015 Herring .................. H01R 12/79
(Continued)

FOREIGN PATENT DOCUMENTS

CN 204966748 U * 1/2016 ........... H01R 12/721
JP 2015-201533 A 11/2015
(Continued)

OTHER PUBLICATIONS

Taiwan Intellectual Property Office, "Office Action with Search Report for Taiwanese Patent Application No. 111143148," Aug. 23, 2023.
(Continued)

*Primary Examiner* — Marcus E Harcum
(74) *Attorney, Agent, or Firm* — Kreative IP Management LLC; Fuiyeong Kim

(57) ABSTRACT

A connector cable includes a plurality of contacts placed in a row and a plurality of cables connected to the plurality of contacts. The plurality of cables includes at least three pairs of high-speed differential signal lines for transmitting high-speed differential signals, at least one non-high-speed differential signal line for transmitting a non-high-speed differential signal, and a plurality of ground terminals. The plurality of ground terminals is allocated to contacts on both ends among the plurality of contacts and a contact between two pairs of high-speed differential signal lines or between one pair of high-speed differential signal lines and one non-high-speed differential signal line to limit the number of consecutive pairs of high-speed differential signal lines to two.

13 Claims, 40 Drawing Sheets

(51) Int. Cl.
*H01R 13/40* (2006.01)
*H01R 13/502* (2006.01)
*H01R 12/57* (2011.01)

(56) References Cited

U.S. PATENT DOCUMENTS

| | | | | |
|---|---|---|---|---|
| 9,545,040 | B2 * | 1/2017 | Garman | H05K 13/00 |
| 10,535,956 | B2 * | 1/2020 | Henry | H01R 12/62 |
| 10,637,200 | B2 * | 4/2020 | Lloyd | G06F 1/189 |
| 10,873,160 | B2 * | 12/2020 | Henry | H01R 13/6592 |
| 11,456,567 | B2 * | 9/2022 | Blackburn | H01R 12/73 |
| 11,749,949 | B2 * | 9/2023 | Huang | H01R 13/6587 439/108 |
| 2006/0019542 | A1 * | 1/2006 | Wu | H01R 12/59 439/638 |
| 2006/0084320 | A1 * | 4/2006 | Tanaka | H01R 31/06 439/628 |
| 2007/0149032 | A1 * | 6/2007 | Saito | H01R 13/6471 439/397 |
| 2009/0191733 | A1 * | 7/2009 | Tanaka | H01R 13/6471 439/108 |
| 2009/0305534 | A1 * | 12/2009 | Tanaka | H01R 24/60 439/108 |
| 2010/0048045 | A1 * | 2/2010 | Tanaka | H01R 13/65914 439/92 |
| 2010/0081302 | A1 | 4/2010 | Atkinson et al. | |
| 2012/0129396 | A1 * | 5/2012 | Wang | H01R 12/721 439/620.24 |
| 2012/0156938 | A1 * | 6/2012 | Zhang | H01R 13/6461 439/660 |
| 2014/0154927 | A1 * | 6/2014 | Nonen | H01R 13/65917 29/857 |
| 2015/0289362 | A1 | 10/2015 | Tanaka et al. | |
| 2016/0111824 | A1 | 4/2016 | Phillips | |
| 2017/0207589 | A1 * | 7/2017 | Wu | H01R 12/53 |
| 2018/0001407 | A1 * | 1/2018 | Wu | H01R 24/60 |
| 2018/0006416 | A1 | 1/2018 | Lloyd et al. | |
| 2018/0115117 | A1 | 4/2018 | Yu et al. | |
| 2018/0138637 | A1 | 5/2018 | Huang | |
| 2018/0151992 | A1 * | 5/2018 | Zhao | H01R 13/6273 |
| 2018/0309242 | A1 | 10/2018 | Weidner et al. | |
| 2018/0337483 | A1 * | 11/2018 | Henry | H01R 12/714 |
| 2018/0358752 | A1 * | 12/2018 | Ellison | H01R 9/03 |
| 2019/0020157 | A1 * | 1/2019 | Wu | H01R 9/0515 |
| 2019/0173237 | A1 * | 6/2019 | Oosaka | H01R 13/26 |
| 2019/0200449 | A1 * | 6/2019 | Toda | H05K 1/0222 |
| 2019/0252812 | A1 * | 8/2019 | Chung | H01R 12/714 |
| 2021/0281017 | A1 * | 9/2021 | Yokota | H05K 1/0218 |
| 2021/0313748 | A1 * | 10/2021 | Henry | H01R 13/642 |
| 2021/0351547 | A1 * | 11/2021 | Little | H01R 13/6581 |
| 2022/0368041 | A1 | 11/2022 | Kiuchi et al. | |
| 2022/0376442 | A1 * | 11/2022 | Sie | H01R 13/6471 |
| 2022/0416476 | A1 * | 12/2022 | Yen | H01R 13/6582 |
| 2023/0010530 | A1 * | 1/2023 | Ayzenberg | H02G 15/06 |
| 2023/0122513 | A1 * | 4/2023 | Wang | H01R 13/6585 439/607.05 |
| 2023/0187862 | A1 * | 6/2023 | Lin | H01R 13/648 439/61 |
| 2023/0352865 | A1 * | 11/2023 | Ito | H01R 13/6594 |
| 2023/0369800 | A1 * | 11/2023 | Wolfe | H01R 13/6471 |
| 2024/0339788 | A1 * | 10/2024 | Xiao | H01R 13/02 |

FOREIGN PATENT DOCUMENTS

| | | | |
|---|---|---|---|
| JP | 2018-503228 | A | 2/2018 |
| JP | 2018-067544 | A | 4/2018 |
| JP | 2018-110104 | A | 7/2018 |
| JP | 2019-133809 | A | 8/2019 |
| JP | 2019-165008 | A | 9/2019 |
| JP | 2022-175488 | A | 11/2022 |
| TW | 566712 | U | 12/2003 |
| TW | 201842713 | A | 12/2018 |

OTHER PUBLICATIONS

Provision of Information submitted to Japan Patent Office, “Reasons for Submission,” Apr. 16, 2024.
Japan Patent Office, “Notice of Reasons for Refusal for Japanese Patent Application No. 2022-008883,” Jul. 1, 2025.
Japan Patent Office, “Notice of Reasons for Refusal for Japanese Patent Application No. 2022-008883,” Dec. 2, 2025.

* cited by examiner

FIRST EMBODIMENT

CONNECTOR CABLE FOR REDUCING CROSSTALK

CROSS-REFERENCE TO RELATED APPLICATION

The present application is based on and claims priority from Japanese Patent Application No. 2022-008883 filed on Jan. 24, 2022, the disclosure of which is hereby incorporated by reference herein in its entirety.

BACKGROUND OF THE INVENTION

Field of the Invention

The present invention relates to a connector cable.

Description of the Related Art

Conventionally, a connector cable having a plurality of contacts placed in a row is known, the contacts being connected to a plurality of cables. For example, as illustrated in FIG. 34 and FIG. 35, which correspond to [FIG. 25] and [FIG. 26] of Japanese Patent Application No. 2021-081890 filed by the present applicant to the JPO, such a connector cable includes two pairs of adjacent high-speed differential signal lines (denoted as "Hi Speed" in FIGS. 34 and 35) for transmitting high-speed differential signals and low-speed differential signal lines (denoted as "Low Speed" in FIGS. 34 and 35) for transmitting low-speed differential signals. In the conventional connector cable illustrated in FIGS. 34 and 35, the high-speed differential signal lines in two pairs are adjacent to each other. Such a configuration is ordinarily adopted in the technical field of connector cables, and the arrangement is also illustrated in, for example, Japanese Patent Laid-Open No. 2018-110104 and Japanese Patent Laid-Open No. 2018-67544 that disclose a connector cable configured such that three pairs of high-speed differential signal lines are consecutively placed.

Furthermore, signal lines including high-speed differential signal lines, low-speed differential signal lines, and a power line are grouped by type such that the lines of the same type are adjacent to each other. Such a configuration is adopted to facilitate manufacturing and has been employed as technical common sense in the technical field of the connector cable.

If a high-speed differential signal line is added to the conventional connector cable illustrated in FIGS. 34 and 35, for example, in the case of a connector cable including three pairs of high-speed differential signal lines and a non-high-speed differential signal line, it is assumed that the three pairs of high-speed differential signal lines are combined into a group and the non-speed differential signal line is disposed next to the high-speed differential signal lines in view of the conventional technical common sense. In other words, the layout of the connector cable is typically divided into two areas: an area allocated for the high-speed differential signal lines and an area allocated for the non-high-speed differential signal line.

If the number of pairs of high-speed differential signal lines increases, crosstalk occurs as high-speed differential signals increase. In the conventional connector cable designed according to the technical common sense, however, it has been difficult to increase high-speed differential signals and reduce crosstalk at the same time. In other words, requested in the technical field of connector cables is a technique of reducing crosstalk even if the number of high-speed differential signal lines increases.

Thus, an object of the present invention is to provide a connector cable that can reduce crosstalk even if the number of high-speed differential signal lines increases, the connector cable including a plurality of contacts placed in a row, the contacts being connected to a plurality of cables.

SUMMARY OF THE INVENTION

A connector cable according to the present invention is a connector cable including a plurality of contacts placed in a row, the contacts being connected to a plurality of cables, the connector cable including at least three pairs of adjacent high-speed differential signal lines for transmitting high-speed differential signals, at least one non-high-speed differential signal line for transmitting a non-high-speed differential signal, and a plurality of ground terminals, wherein the ground terminals are allocated to the contacts on both ends from among the plurality of contacts and between the pair of high-speed differential signal lines and the pair of high-speed differential signal lines or between the pair of high-speed differential signal lines and the non-high-speed differential signal line, and the number of consecutive pairs of high-speed differential signal lines is limited to two by allocating the non-high-speed differential signal line to an intermediate part of the at least three pairs of high-speed differential signal lines placed inside the ground terminals allocated to the contacts on both ends.

In other words, the degree of crosstalk based on a high-speed differential signal depends upon a distance, and thus a pair of high-speed differential signal lines is most seriously affected by an adjacent pair of high-speed differential signal lines. In contrast, the number of consecutive pairs of high-speed differential signal lines is limited to two in the connector cable of the present invention. Thus, for example, a pair of high-speed differential signal lines allocated to an intermediate part has another pair of high-speed differential signal lines allocated on one side with the ground terminal interposed between the pairs and has the non-high-speed differential signal line allocated on the other side with the ground terminal interposed between the pair of high-speed differential signal lines and the non-high-speed differential signal line. Hence, in the connector cable of the present invention, only an adjacent pair of high-speed differential signal lines causes a serious impact of crosstalk, leading to minimum influence of crosstalk.

In the connector cable of the present invention, the non-high-speed differential signal line may include a pair of adjacent differential signal lines for transmitting a signal at a lower speed than the pair of high-speed differential signal lines.

In the connector cable of the present invention, the non-high-speed differential signal line may be a low-speed signal single end for transmitting a signal at a lower speed than high-speed differential signal lines constituting the pair of high-speed differential signal lines.

In the connector cable of the present invention, the non-high-speed differential signal line may be a power line.

In the connector cable of the present invention, the non-high-speed differential signal line and high-speed differential signal lines constituting the pair of high-speed differential signal lines may have different appearances.

The connector cable of the present invention may further include a contact to which another non-high-speed differential signal line different from the non-high-speed differential signal line is allocated, outside the ground terminals allocated to the contacts on both ends.

The present invention can provide a connector cable that can reduce crosstalk even if the number of high-speed differential signal lines increases, the connector cable including a plurality of contacts placed in a row, the contacts being connected to a plurality of cables.

DETAILED DESCRIPTION OF THE PREFERRED EMBODIMENTS

Figure 1:
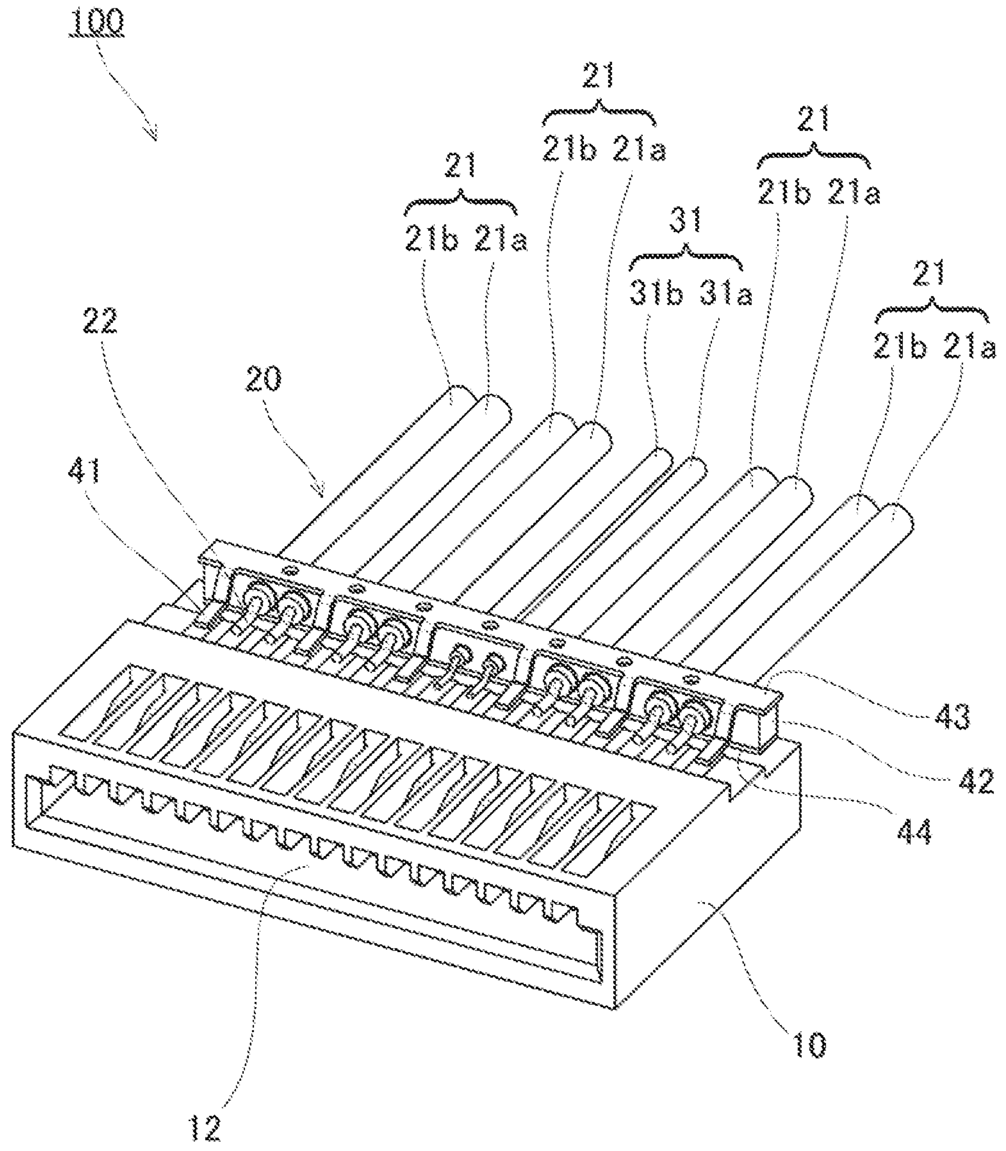
FIG. 1 is a perspective view of a connector cable according to a first embodiment when the front of the connector cable is viewed from the upper right.
Figure 2:
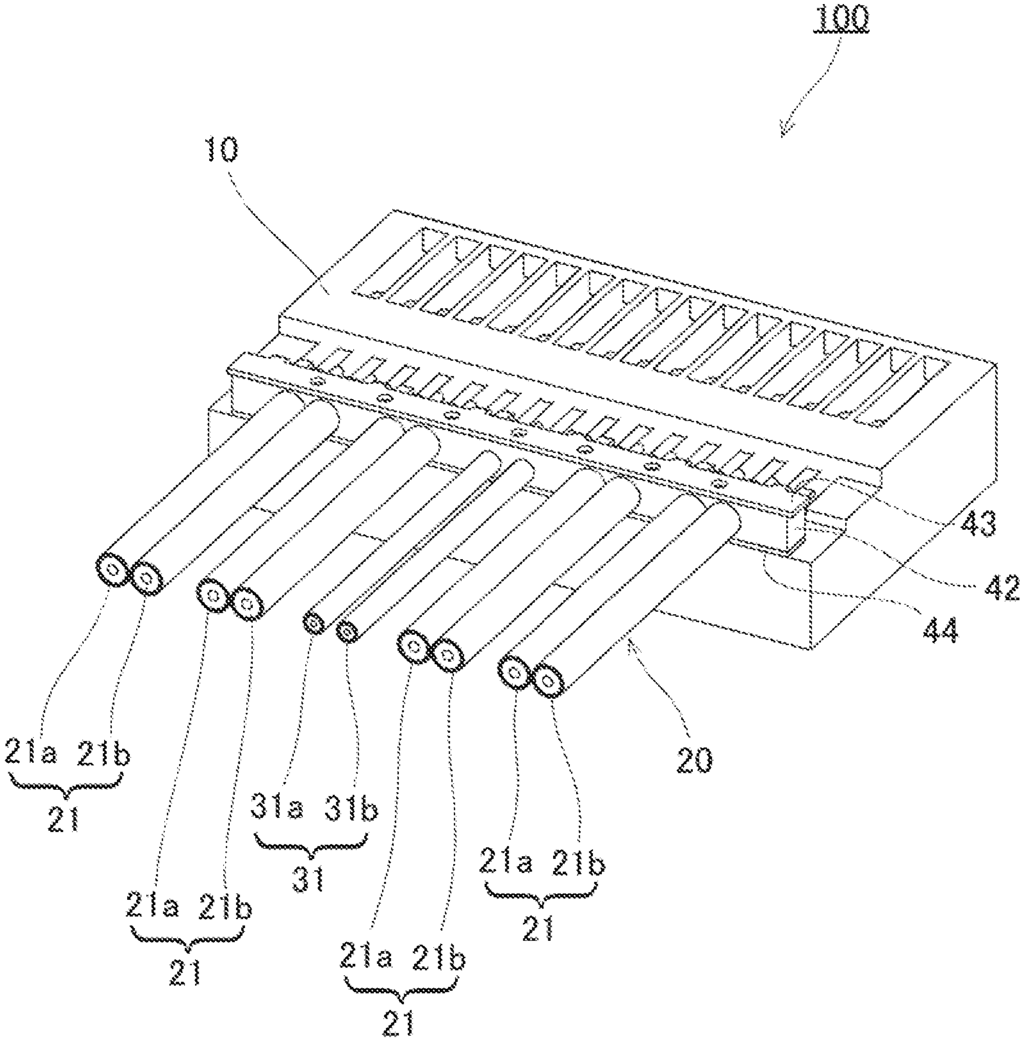
FIG. 2 is a perspective view of the connector cable according to the first embodiment when the back of the connector cable is viewed from the upper left.

Preferred embodiments of the present invention for implementing the present invention will be described below in accordance with the accompanying drawings. The following embodiments do not limit the invention according to claims. All the combinations of features described in the embodiments are not always necessary for the solver of the invention.

First Embodiment

Referring to FIGS. 1 to 7, a first embodiment that can be implemented by a connector cable according to the present invention will be described below.

As illustrated in FIGS. 1 to 4, a connector cable 100 according to the first embodiment includes a connector housing 10, a plurality of contacts 11 placed in a row in the connector housing 10, and a cable array 20 serving as a plurality of cables according to the present invention, the cables being connected to the contacts 11 placed in a row. In other words, the connector cable 100 according to the first embodiment is configured such that the cable array 20 is connected to the connector housing 10 having the contacts 11.

The connector housing 10 has a substantially rectangular outside shape. Formed at the front of the connector housing 10 is a fitting hole 12. A counterpart connector cable, which is not illustrated, is fit into the fitting hole 12, thereby electrically connecting the connector cable 100 according to the first embodiment and the counterpart connector cable, which is not illustrated.

Figure 3:
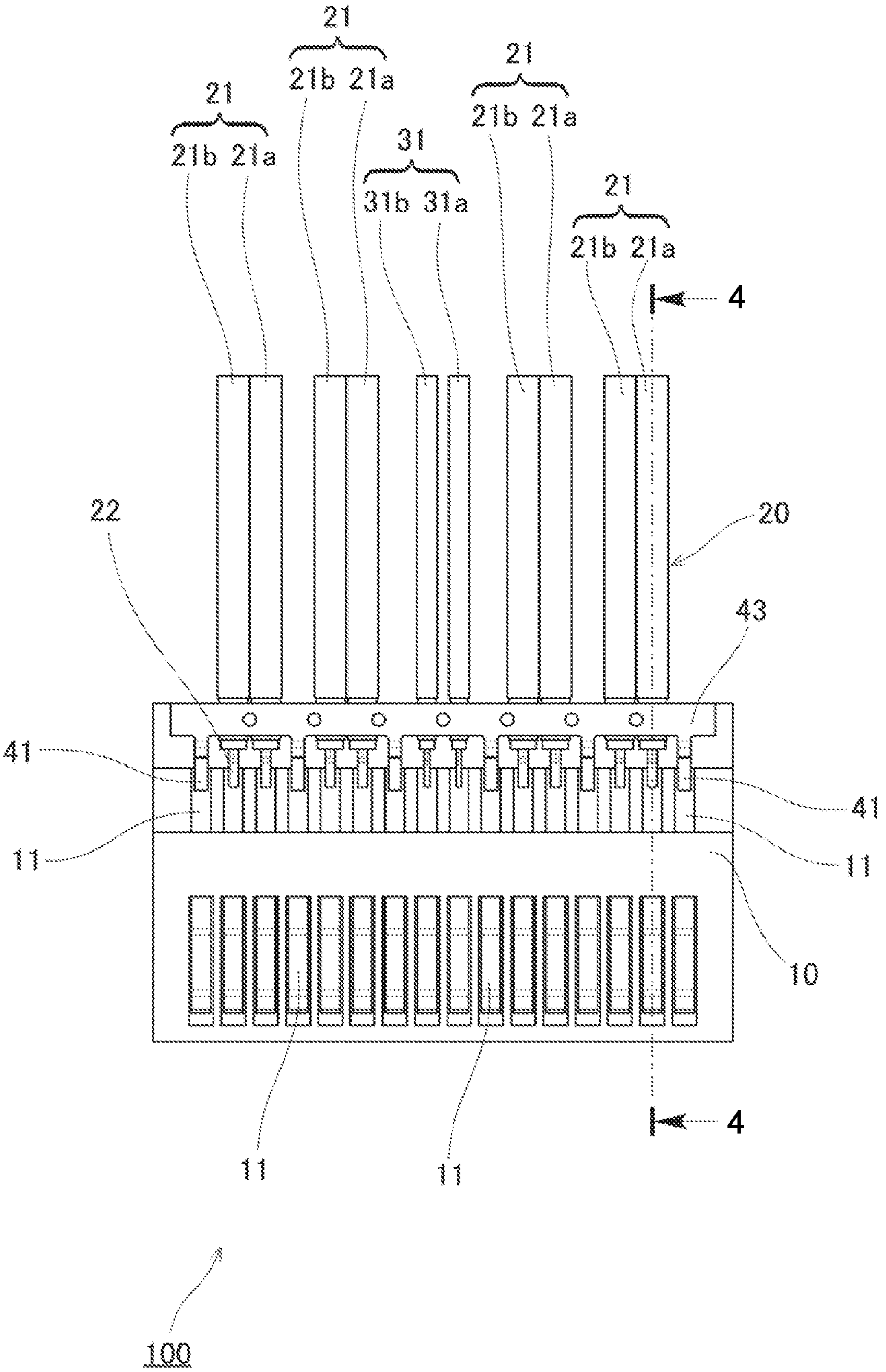
FIG. 3 is a top view of the connector cable according to the first embodiment.
Figure 4:
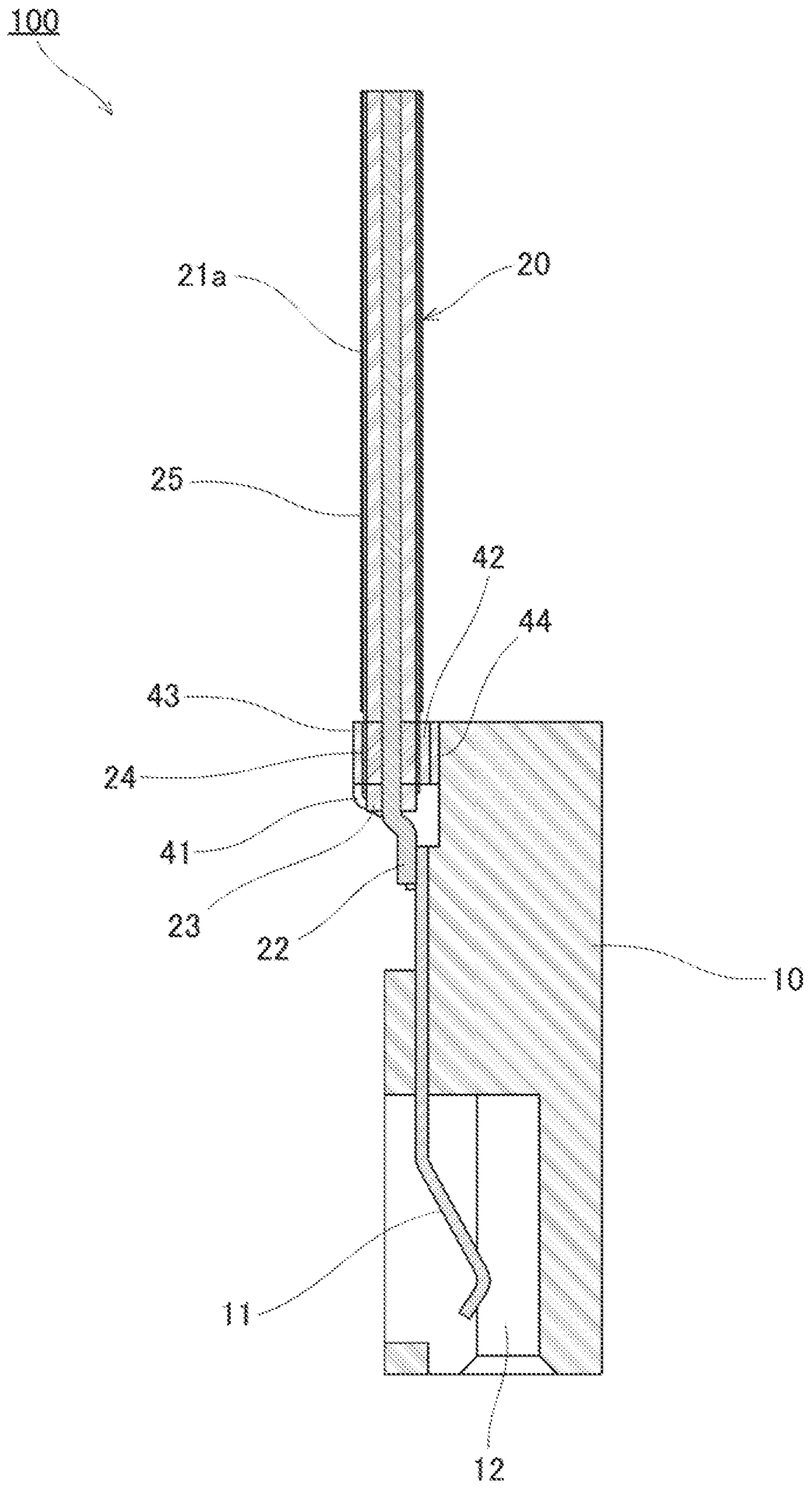
FIG. 4 is a longitudinal section taken along line 4-4 of FIG. 3.
Figure 5:
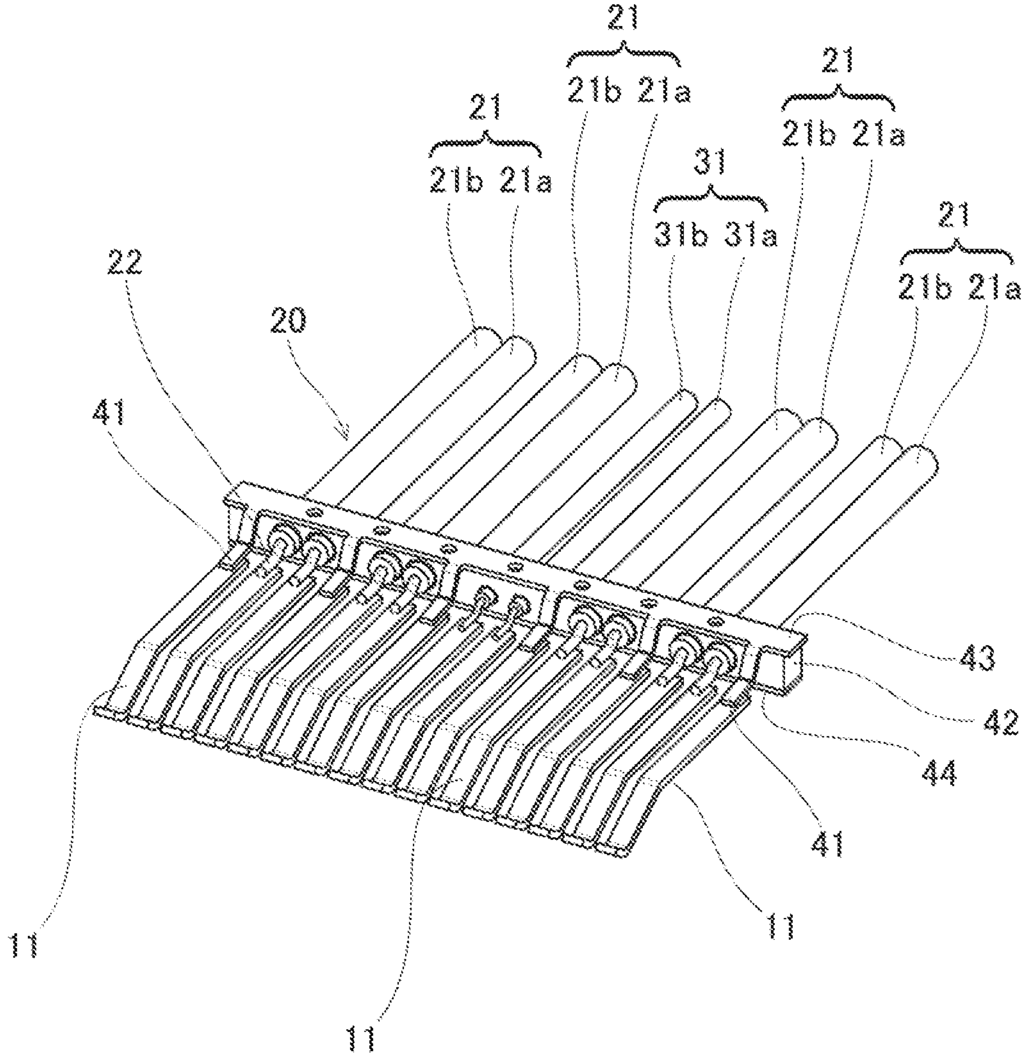
FIG. 5 is a perspective view in which only a connector housing is hidden in the connector cable according to the first embodiment illustrated in FIG. 1.

The contacts 11 are formed by members made of conductive metals. As illustrated in FIGS. 3 to 5, in the first embodiment, the sixteen contacts 11 are provided. Counterpart contacts provided for the counterpart connector cable, which is not illustrated, are brought into contact with the front sides of the contacts 11, while the cable array 20, which will be described later, is connected to the rear sides of the contacts 11.

Figure 6:
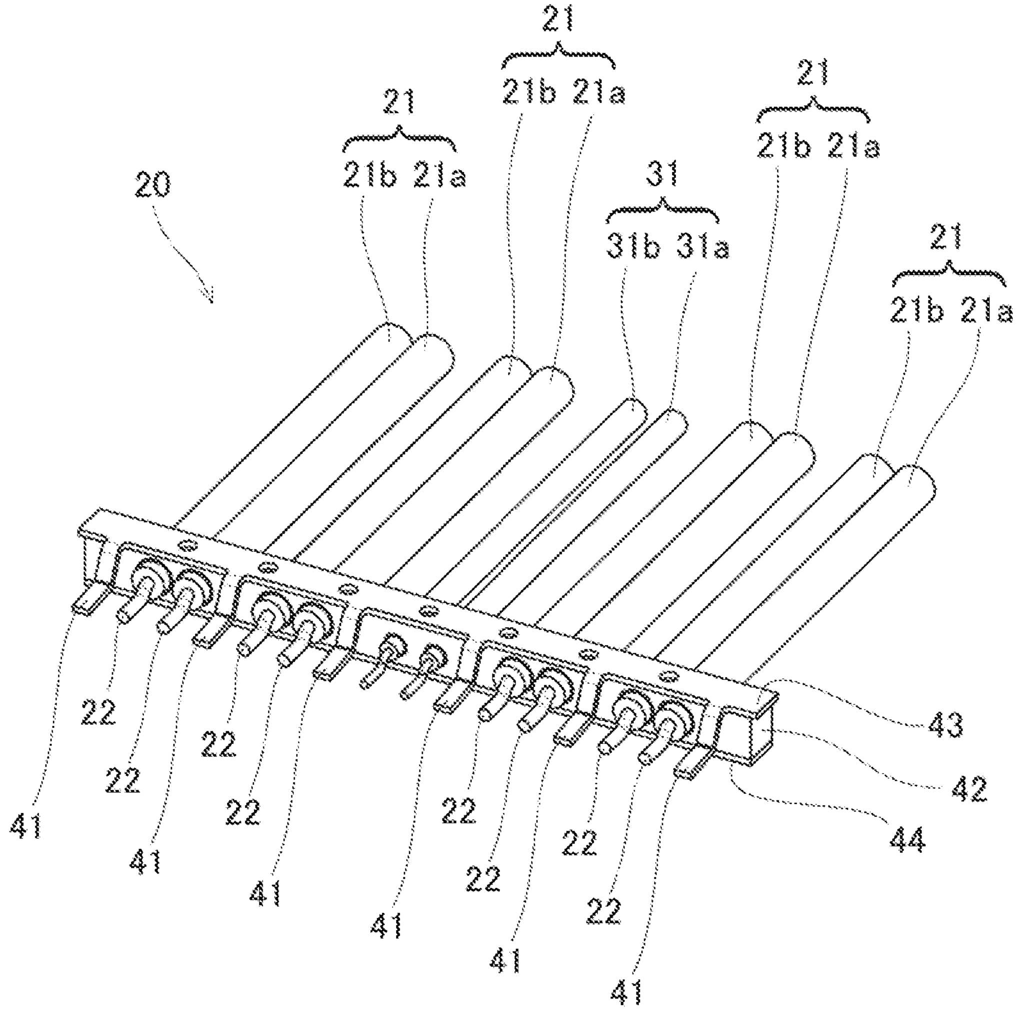
FIG. 6 is a perspective view of a cable array according to the first embodiment when the front of the cable array is viewed from the upper right.

The cable array 20 includes, as illustrated in FIG. 6, four pairs of adjacent high-speed differential signal lines 21 (21*a*, 21*b*) for transmitting high-speed differential signals, and a pair of adjacent low-speed differential signal lines 31 (31*a*, 31*b*) for transmitting low-speed differential signals serving as non-high-speed differential signals. Moreover, the cable array 20 includes a plurality of ground terminals 41.

Figure 7:
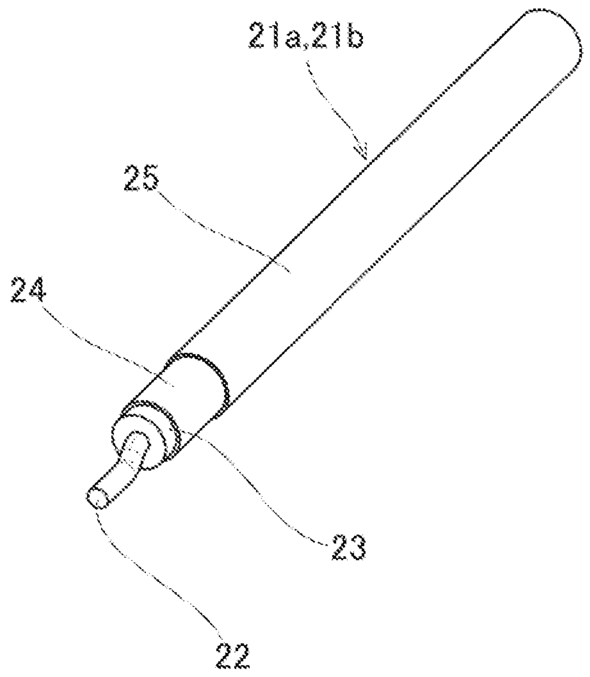
FIG. 7 is a perspective view of a high-speed differential signal line serving as a coaxial line constituting the cable array according to the first embodiment when the front of the high-speed differential signal line is viewed from the upper right.

The pair of high-speed differential signal lines 21 (21*a*, 21*b*) includes two high-speed differential signal lines 21*a* and 21*b*, each being illustrated as a coaxial line in FIG. 7. As illustrated in FIG. 7, the high-speed differential signal lines 21*a* and 21*b* each includes an inner conductor 22 acting as a signal line, a first insulator 23 covering the outer surface of the inner conductor 22, a ground conductor 24 acting as an outer conductor covering the outer surface of the first insulator 23, and a second insulator 25 covering the outer surface of the ground conductor 24.

The inner conductor 22 according to the first embodiment is used as a conductor for transmitting a high-speed differential signal. The first insulator 23 of the first embodiment is made of, for example, insulating materials such as polyethylene and surrounds the outer surface of the inner conductor 22 so as to protect the inner conductor 22. The ground conductor 24 of the first embodiment is a member surrounding the outer surface of the first insulator 23. The ground conductor 24 is composed of, for example, a braided wire including a netted copper wire or an aluminum foil piece. The ground conductor 24 acts as an electromagnetic shield, thereby protecting the inner conductor 22, which transmits a high-speed differential signal, from the influence of incoming electromagnetic waves or the like from the outside. The second insulator 25 of the first embodiment is disposed at each of the outermost surfaces of the high-speed differential signal lines 21*a* and 21*b*, so that the second insulator 25 acts as a protective coating for each of the high-speed differential signal lines 21*a* and 21*b* and forms the outside shape of the high-speed differential signal line.

The two high-speed differential signal lines 21*a* and 21*b* are used to form the pair of high-speed differential signal lines 21 (21*a*, 21*b*). For example, an original signal is transmitted to the high-speed differential signal line 21*a* while a signal in opposite phase is transmitted to the high-speed differential signal line 21*b*, so that the signals are balanced to obtain a differential signal. In other words, a differential signal is transmitted by using the two high-speed differential signal lines 21*a* and 21*b*. This transmission method is resistant to noise.

The pair of low-speed differential signal lines 31 (31*a*, 31*b*) according to the first embodiment is also formed by combining two signal lines configured like the high-speed differential signal lines 21*a* and 21*b* illustrated in FIG. 7. The pair of low-speed differential signal lines 31 (31*a*, 31*b*) according to the first embodiment is used for transmitting signals at lower speeds than the pair of high-speed differential signal lines 21 (21*a*, 21*b*). Thus, the low-speed differential signal lines 31 are formed with smaller wire diameters than the four pairs of high-speed differential signal lines 21 (21*a*, 21*b*) of the first embodiment. In other words, in the first embodiment, the low-speed differential signal lines 31*a* and 31*b* constituting the pair of low-speed differential signal lines 31 and the high-speed differential signal lines 21*a* and 21*b* constituting the pair of high-speed differential signal lines 21 are configured with different appearances.

In the cable array 20 of the first embodiment, as illustrated in FIG. 6, the four pairs of high-speed differential signal lines 21 (21*a*, 21*b*) and the pair of low-speed differential signal lines 31 (31*a*, 31*b*) are placed in a row with the parts of the ground conductors 24 fixed by a solder block 42. Furthermore, an upper ground bar 43 is disposed on the solder block 42 while a lower ground bar 44 is disposed under the solder block 42, so that the upper and lower sides of the solder block 42 are interposed between the two ground bars 43 and 44. The cable array 20 of the first embodiment is configured such that the ground conductors 24 of the four pairs of high-speed differential signal lines 21 (21*a*, 21*b*), which are coaxial lines, and the ground conductors of the pair of low-speed differential signal lines 31 (31*a*, 31*b*) are connected together by placing the upper and lower sides of the solder block 42 between the two ground bars 43 and 44.

Furthermore, the upper ground bar 43 has the ground terminals 41 extending downward from the front of the upper ground bar 43. As illustrated in, for example, FIGS. 3 and 5, the ground terminals 41 are formed so as to be allocated to the contacts 11 on both ends from among the sixteen contacts 11 provided for the connector cable 100 of the first embodiment, and between a pair of high-speed differential signal lines 21 and a pair of high-speed differential signal lines 21 or between a pair of high-speed differential signal lines 21 and a pair of low-speed differential signal lines 31.

As illustrated in, for example, FIGS. 5 and 6, the cable array 20 of the first embodiment is configured such that the number of consecutive pairs of high-speed differential signal lines 21 (21*a*, 21*b*) is limited to two by allocating the pair of low-speed differential signal lines 31 (31*a*, 31*b*) at the central position of the four pairs of the high-speed differential signal lines 21 (21*a*, 21*b*) that are placed inside the ground terminals 41 allocated to the contacts 11 on both ends. In other words, since the number of consecutive pairs of high-speed differential signal lines 21 (21*a*, 21*b*) is limited to two in the cable array 20 of the first embodiment, for example, a pair of high-speed differential signal lines 21 (21*a*, 21*b*) allocated to an intermediate part has another pair of high-speed differential signal lines 21 (21*a*, 21*b*) allocated on one side with the ground terminal 41 interposed between the pairs and has the pair of non-high-speed differential signal lines 31 (31*a*, 31*b*) allocated on the other side with the ground terminal 41 interposed between the pairs. Thus, in the connector cable 100 of the first embodiment, only the adjacent pair of high-speed differential signal lines 21 (21*a*, 21*b*) causes strong crosstalk, thereby minimizing the influence of crosstalk. With this configuration, the connector cable 100 of the first embodiment can increase the number of high-speed differential signal lines and reduce crosstalk.

The effect of reducing crosstalk is confirmed through studies by the inventors. With reference to FIGS. 8A to 8F, the effect of the connector cable 100 according to the first embodiment will be described below.

Figure 8A:
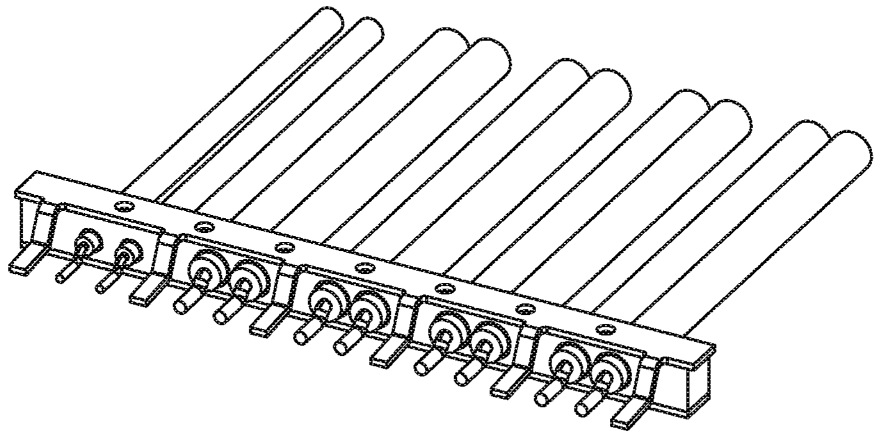
FIG. 8A RELATED ART
FIGS. 8A to 8F are explanatory drawings showing the effect of the connector cable according to the first embodiment.
Figure 8B:
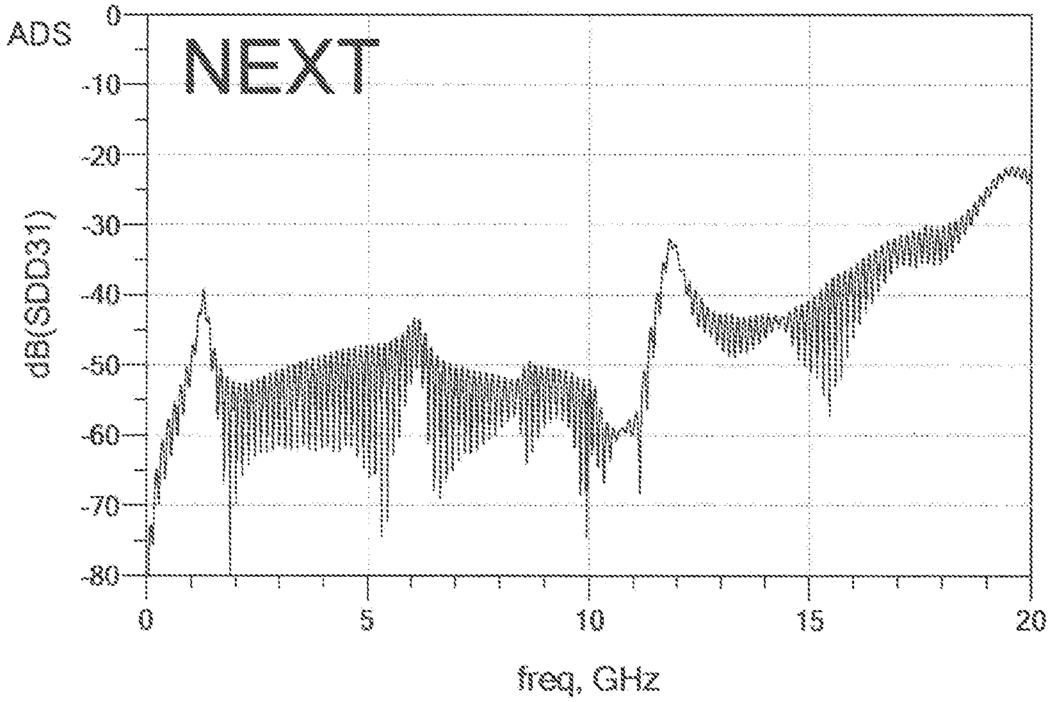
Figure 8C:
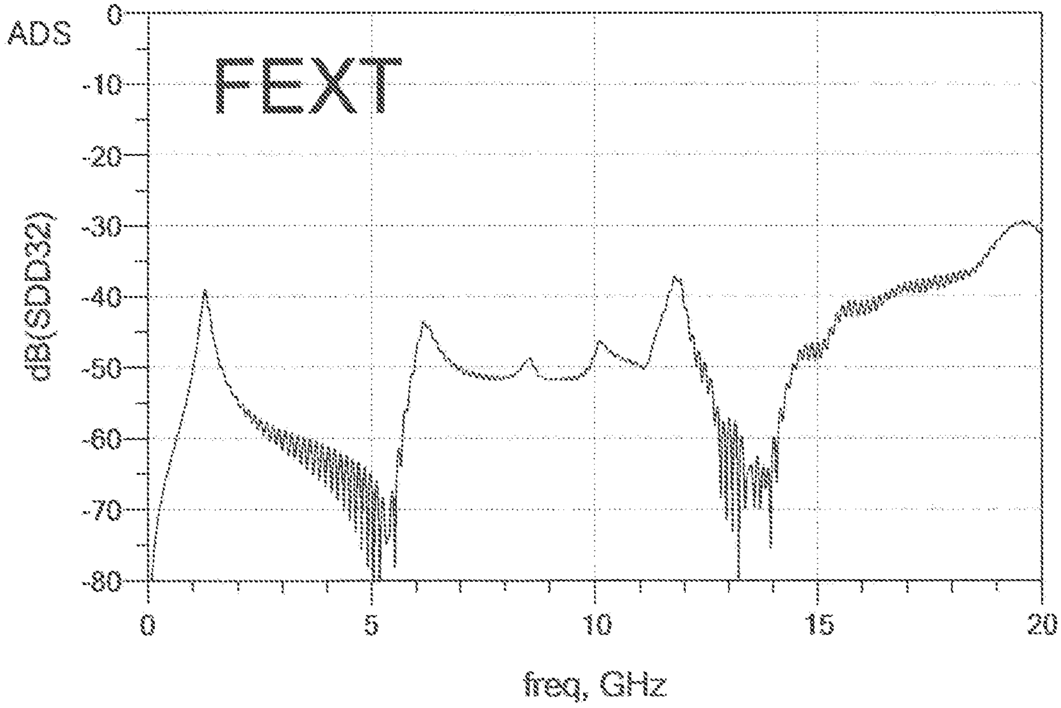
Figure 8D:
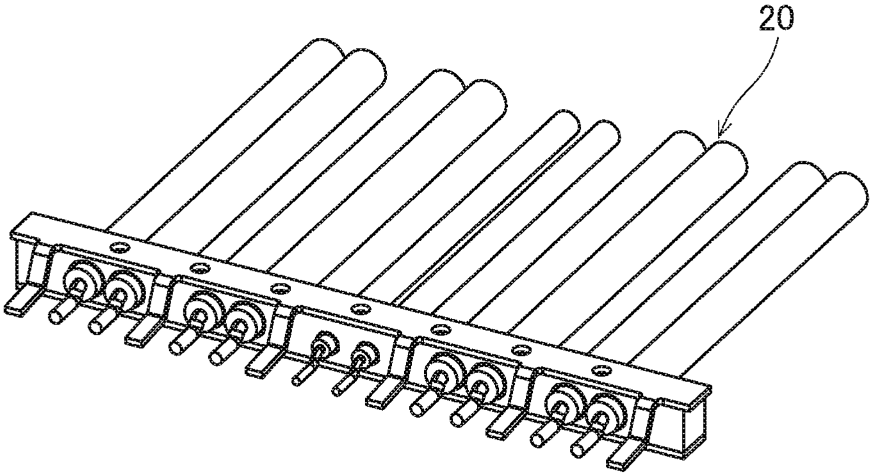
Figure 8E:
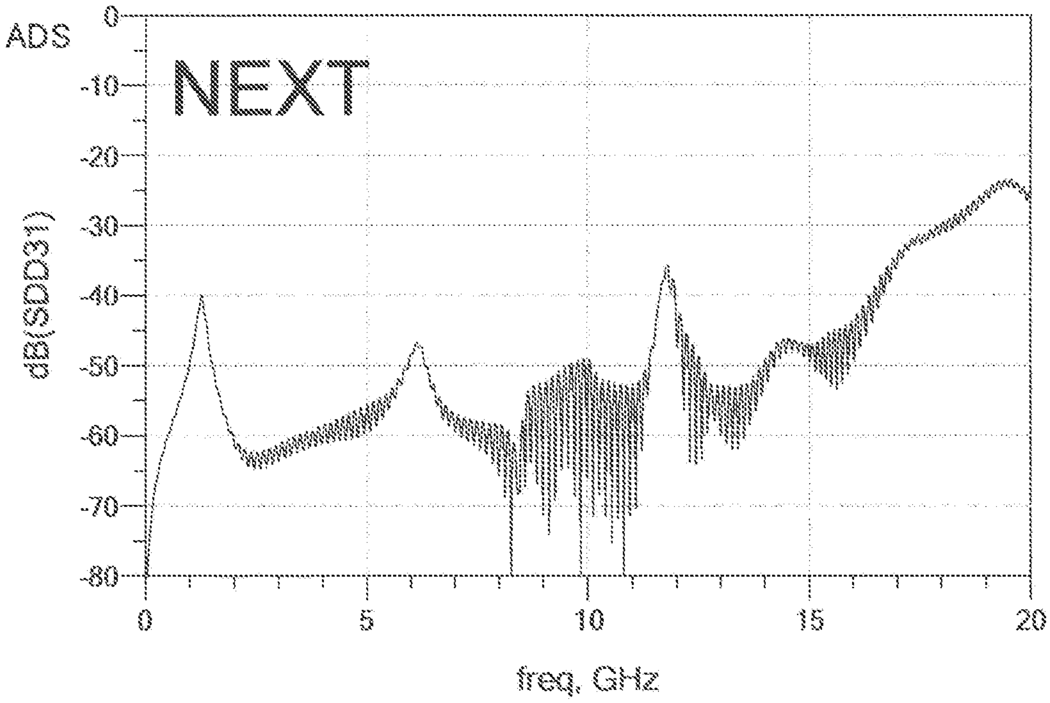
Figure 8F:
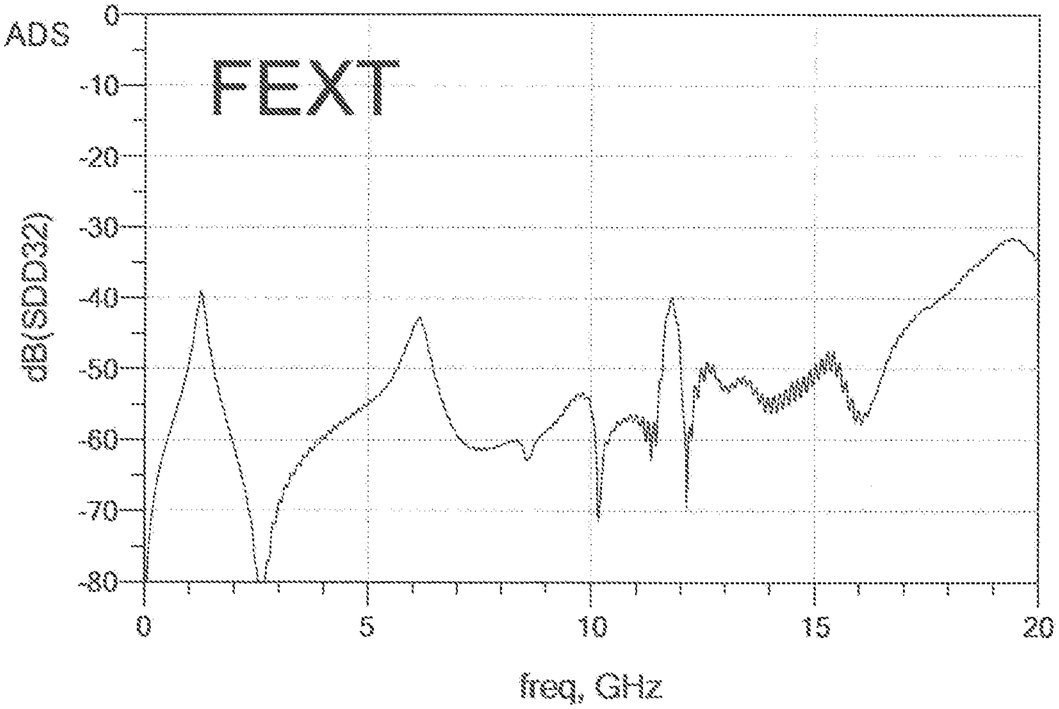

In FIGS. 8A to 8F, the drawings denoted as FIGS. 8A, 8B, and 8C illustrate the contents of the related art, whereas the drawings denoted as FIGS. 8D, 8E, and 8F illustrate the contents of the first embodiment. As illustrated in FIGS. 8A and 8D, in the cable array of the connector cable including four pairs of high-speed differential signal lines 21 (21*a*, 21*b*) and a pair of low-speed differential signal lines 31 (31*a*, 31*b*), the present inventors estimated a configuration of the related art such that four pairs of high-speed differential signal lines 21 (21*a*, 21*b*) are placed in a group and a pair of low-speed differential signal lines 31 (31*a*, 31*b*) is disposed next to the high-speed differential signal lines 21. In the first embodiment, the cable array is configured so that the number of consecutive pairs of high-speed differential signal lines 21 (21*a*, 21*b*) is limited to two by allocating the pair of low-speed differential signal lines 31 (31*a*, 31*b*) at the central position of the four pairs of the high-speed differential signal lines 21 (21*a*, 21*b*). A simulation was conducted on the noise of crosstalk in each of the configurations. By the simulation, graphs of NEXT (Near End Cross Talk: signal transfer to a close terminal) that is crosstalk corresponding to a signal transmitted to an input-side terminal and FEXT (Far End Cross Talk: signal transfer to a remote terminal) that is crosstalk corresponding to a signal transmitted to an output-side terminal were obtained. In the graphs of the drawings denoted as FIGS. 8B, 8C, 8E, and 8F in FIGS. 8A to 8F, the abscissa indicates a signal frequency (GHz) and the ordinate indicates the attenuation (dB) of a transmitted signal.

As is evident from a comparison between the drawings FIGS. 8B and 8E, the noise of NEXT is definitely lower in the first embodiment, so that lower crosstalk was confirmed as compared with the related art. Furthermore, as is evident from a comparison between the drawings FIGS. 8C and 8F, the noise of FEXT is definitely lower in the first embodiment, so that lower crosstalk was confirmed as compared with the related art. In other words, as indicated in FIGS. 8A to 8F by the results of examinations and studies by the inventors, crosstalk was reduced by the cable array 20 of the connector cable 100 according to the first embodiment as compared with the related art. This proved the superiority of the first embodiment.

Referring to FIGS. 1 to 8F, the first embodiment is described as an embodiment implementable by the connector cable according to the present invention. However, the technical scope of the present invention is not limited to the scope of the first embodiment. The first embodiment can be changed or modified in various ways.

For example, the first embodiment describes an embodiment in which the pair of low-speed differential signal lines 31 (31*a*, 31*b*) is used as non-high-speed differential signal lines for transmitting non-high-speed differential signals. The non-high-speed differential signal lines of the present invention can be configured as one or more unpaired non-high-speed differential signal lines.

For example, the first embodiment describes an example in which the pair of low-speed differential signal lines 31 (31*a*, 31*b*) is used as non-high-speed differential signal lines for transmitting non-high-speed differential signals. The non-high-speed differential signal lines of the present invention may be one or more low-speed signal single ends for transmitting signals at a lower speed than the high-speed differential signal lines 21*a* and 21*b* constituting a pair of high-speed differential signal lines 21.

For example, the first embodiment describes an example in which the pair of low-speed differential signal lines 31 (31*a*, 31*b*) is used as non-high-speed differential signal lines for transmitting non-high-speed differential signals. The non-high-speed differential signal lines of the present invention may be one or more power lines.

Figure 9:
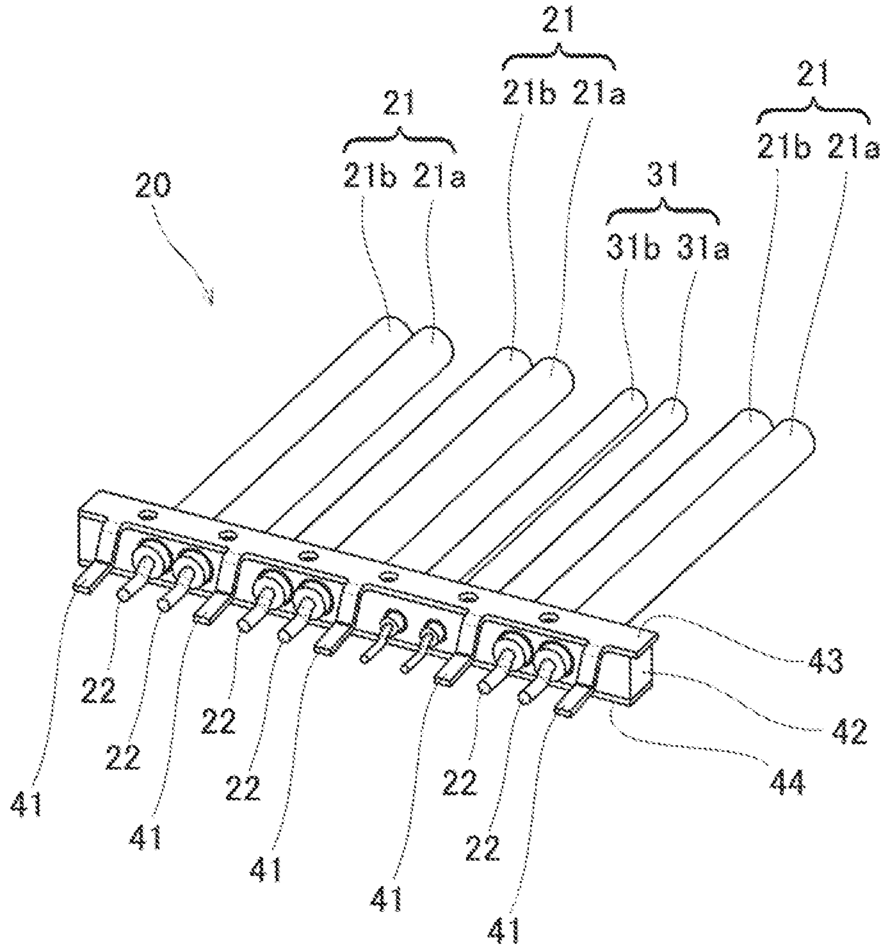
FIG. 9 illustrates a configuration example of another cable array of the first embodiment implementable by the connector cable of the present invention.
Figure 10:
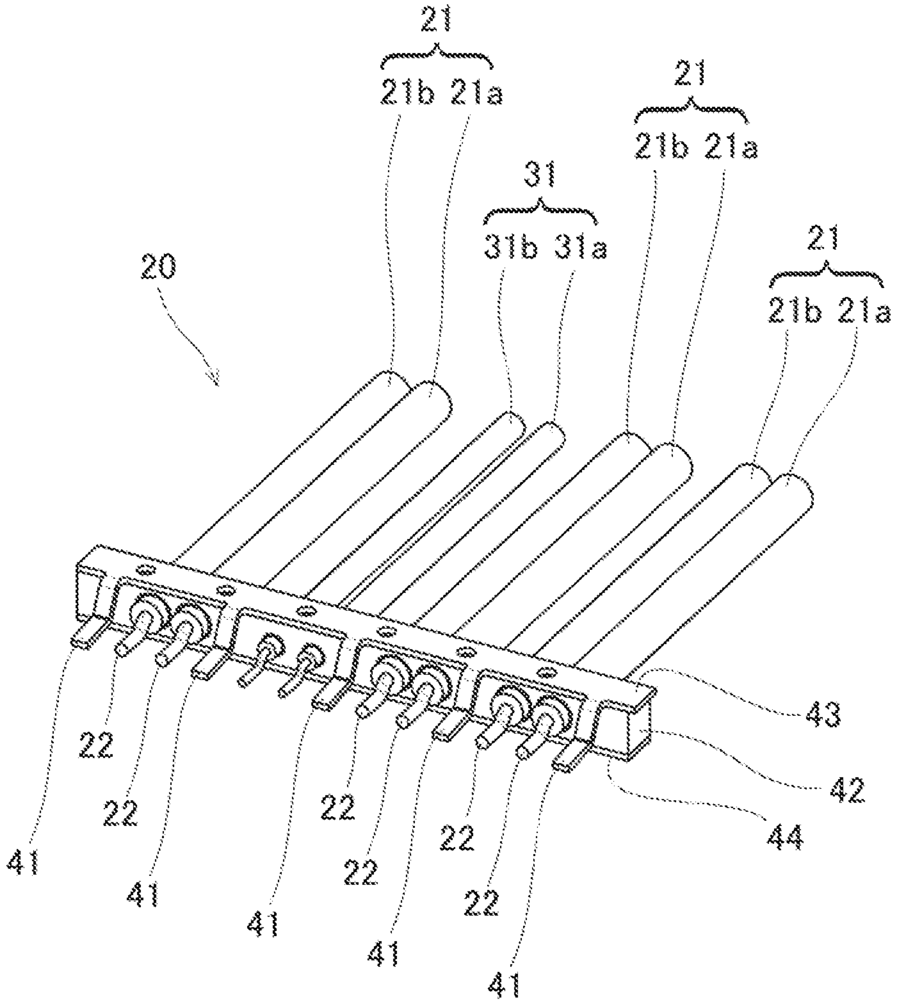
FIG. 10 illustrates a configuration example of still another cable array of the first embodiment implementable by the connector cable of the present invention.
Figure 11:
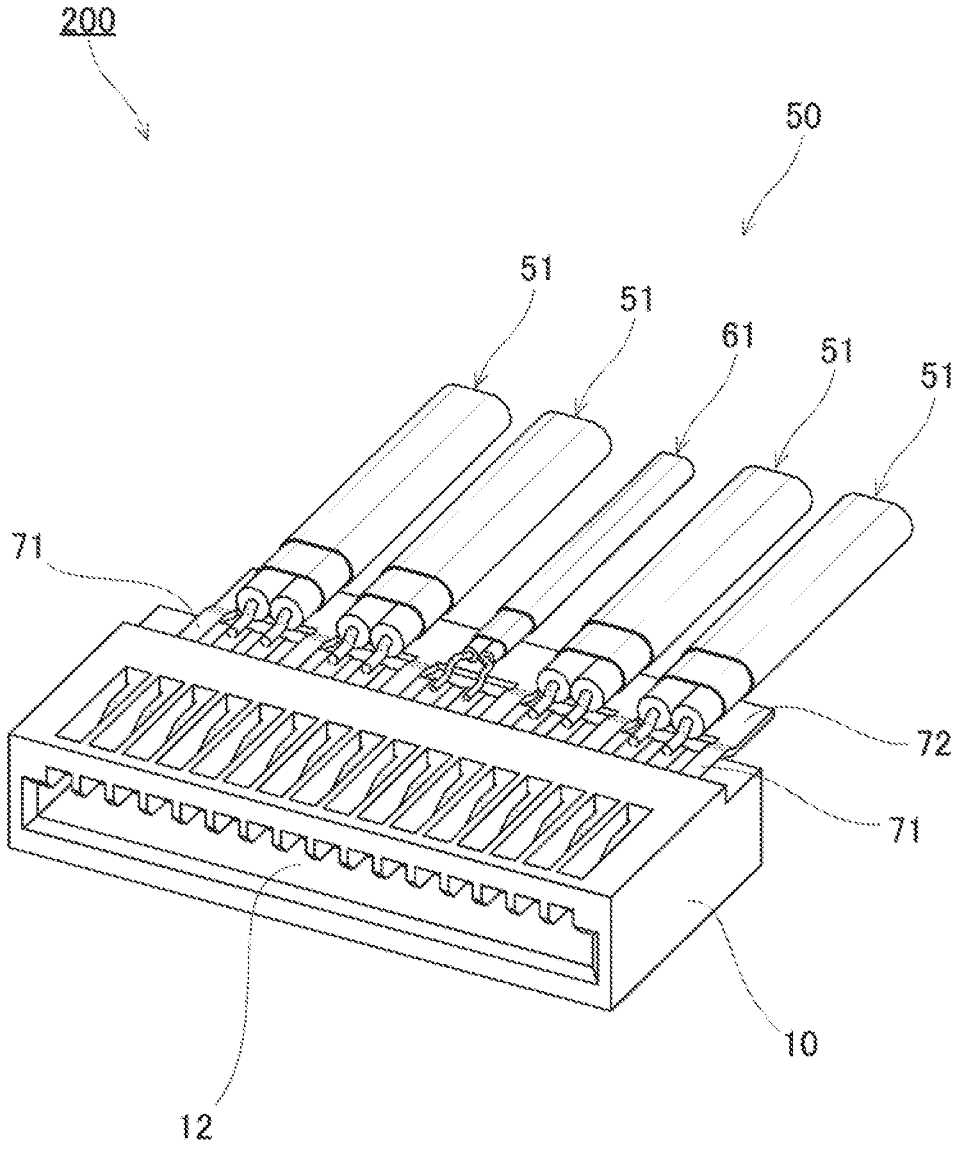
FIG. 11 is a perspective view of a connector cable according to a second embodiment when the front of the connector cable is viewed from the upper right.
Figure 12:
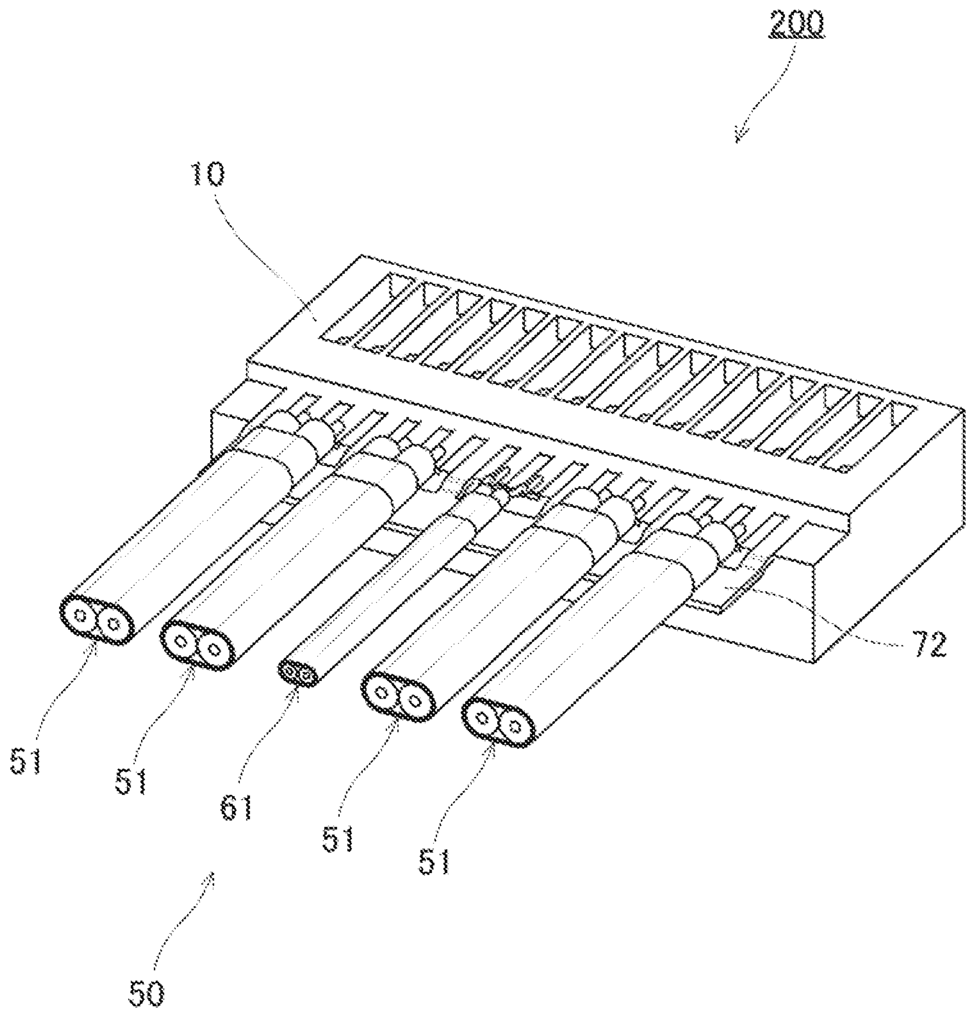
FIG. 12 is a perspective view of the connector cable according to the second embodiment when the back of the connector cable is viewed from the upper left.

For example, in the cable array 20 of the connector cable 100 according to the first embodiment, the number of consecutive pairs of high-speed differential signal lines 21 (21*a*, 21*b*) is limited to two by allocating the pair of low-speed differential signal lines 31 (31*a*, 31*b*) at the central position of the four pairs of high-speed differential signal lines 21 (21*a*, 21*b*). However, the connector cable of the present invention is applicable if the number of consecutive pairs of high-speed differential signal lines 21 is limited to two by allocating the pair of non-high-speed differential signal lines (the pair of low-speed differential signal lines 31) to an intermediate part of three or more pairs of high-speed differential signal lines 21 placed inside the ground terminals 41 allocated to the contacts 11 on both ends. Thus, configurations illustrated in, for example, FIGS. 9 and 10 can achieve a connector cable with lower crosstalk than the related art. If three pairs of high-speed differential signal lines 21 and a pair of low-speed differential signal lines 31 are placed, as illustrated in a configuration example of FIG. 9, the signal lines placed inside the ground terminals 41 allocated to the contacts 11 on both ends may include a pair of high-speed differential signal lines 21, a pair of low-speed differential signal lines 31, and two pairs of high-speed differential signal lines 21 that are placed in this order when viewed from the right side. As illustrated in a configuration example of FIG. 10, the signal lines placed inside the ground terminals 41 allocated to the contacts 11 on both ends may include two pairs of high-speed differential signal lines 21, a pair of low-speed differential signal lines 31, and a pair of high-speed differential signal lines 21 that are placed in this order when viewed from the right side.

Referring to FIGS. 1 to 10, the first embodiment as an embodiment implementable by the connector cable according to the present invention and the modification thereof are described. However, the technical scope of the present invention is not limited to the scope of the first embodiment. The first embodiment can be changed or modified in various ways. A variety of embodiments implementable by the connector cable according to the present invention will be described below. In the following embodiments, members identical or similar to those of the first embodiment are indicated by the same reference characters, and an explanation thereof is omitted.

Second Embodiment

Referring to FIGS. 11 to 17, a cable array 50 and a connector cable 200 including the cable array 50 according to a second embodiment will be described below. In the cable array 20 of the first embodiment, the four pairs of high-speed differential signal lines 21 (21*a*, 21*b*) and the pair of low-speed differential signal lines 31 (31*a*, 31*b*) are configured such that each of the pairs includes two signal lines that are coaxial lines. In the following second embodiment, an embodiment of a pair cable formed by combining two signal lines will be described.

As illustrated in FIGS. 11 to 14, the connector cable 200 according to the second embodiment includes a connector housing 10, a plurality of contacts 11 and 71 placed in a row in the connector housing 10, and the cable array 50 serving as a plurality of cables according to the present invention, the cables being connected to the contacts 11 and 71 placed in a row. In other words, the connector cable 200 according to the second embodiment is configured such that the cable array 50 is connected to the connector housing 10 having the contacts 11 and 71.

The connector housing 10 has a substantially rectangular outside shape. Formed at the front of the connector housing 10 is a fitting hole 12. A counterpart connector cable, which is not illustrated, is fit into the fitting hole 12, thereby electrically connecting the connector cable 200 according to the second embodiment and the counterpart connector cable, which is not illustrated.

Figure 13:
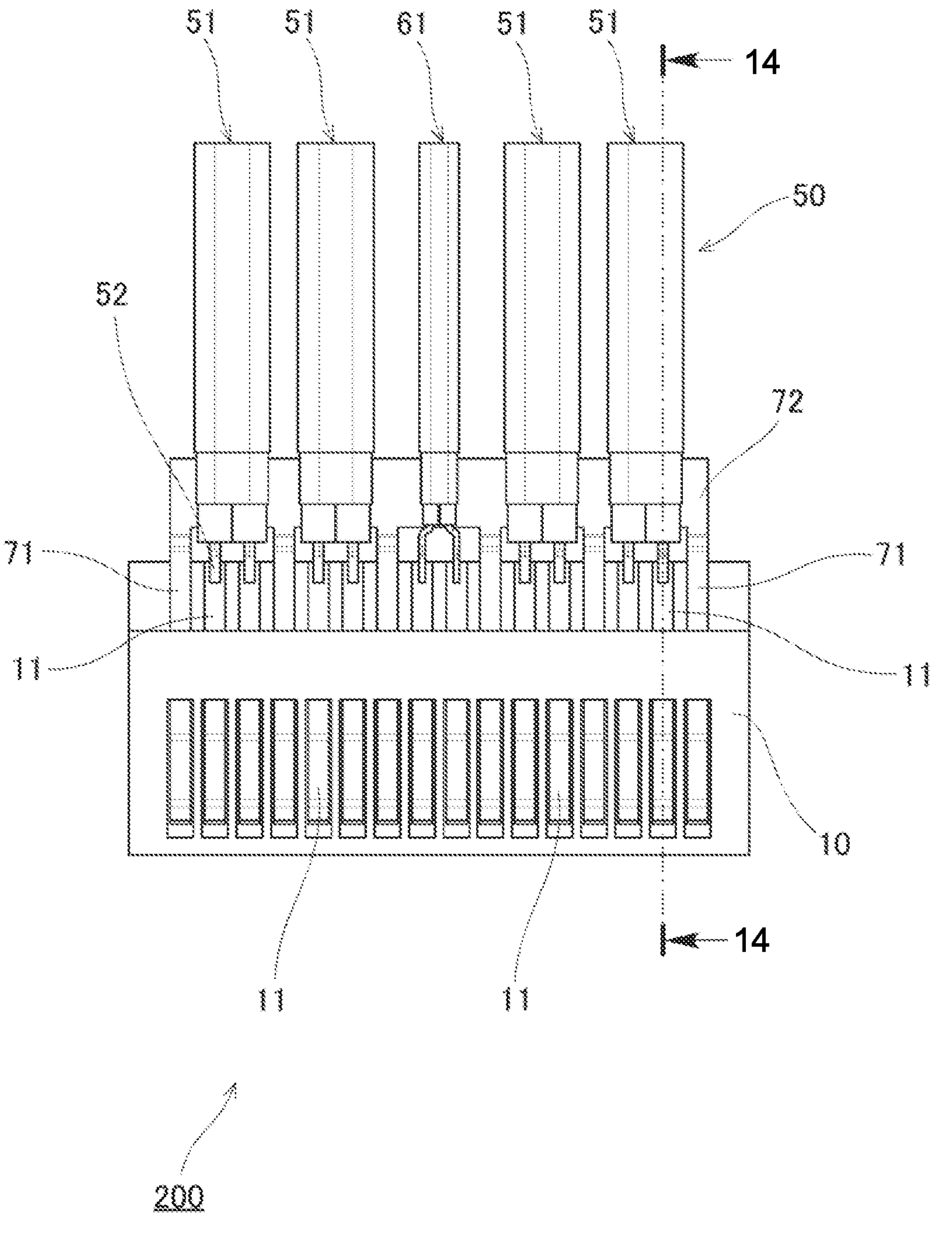
FIG. 13 is a top view of the connector cable according to the second embodiment.
Figure 14:
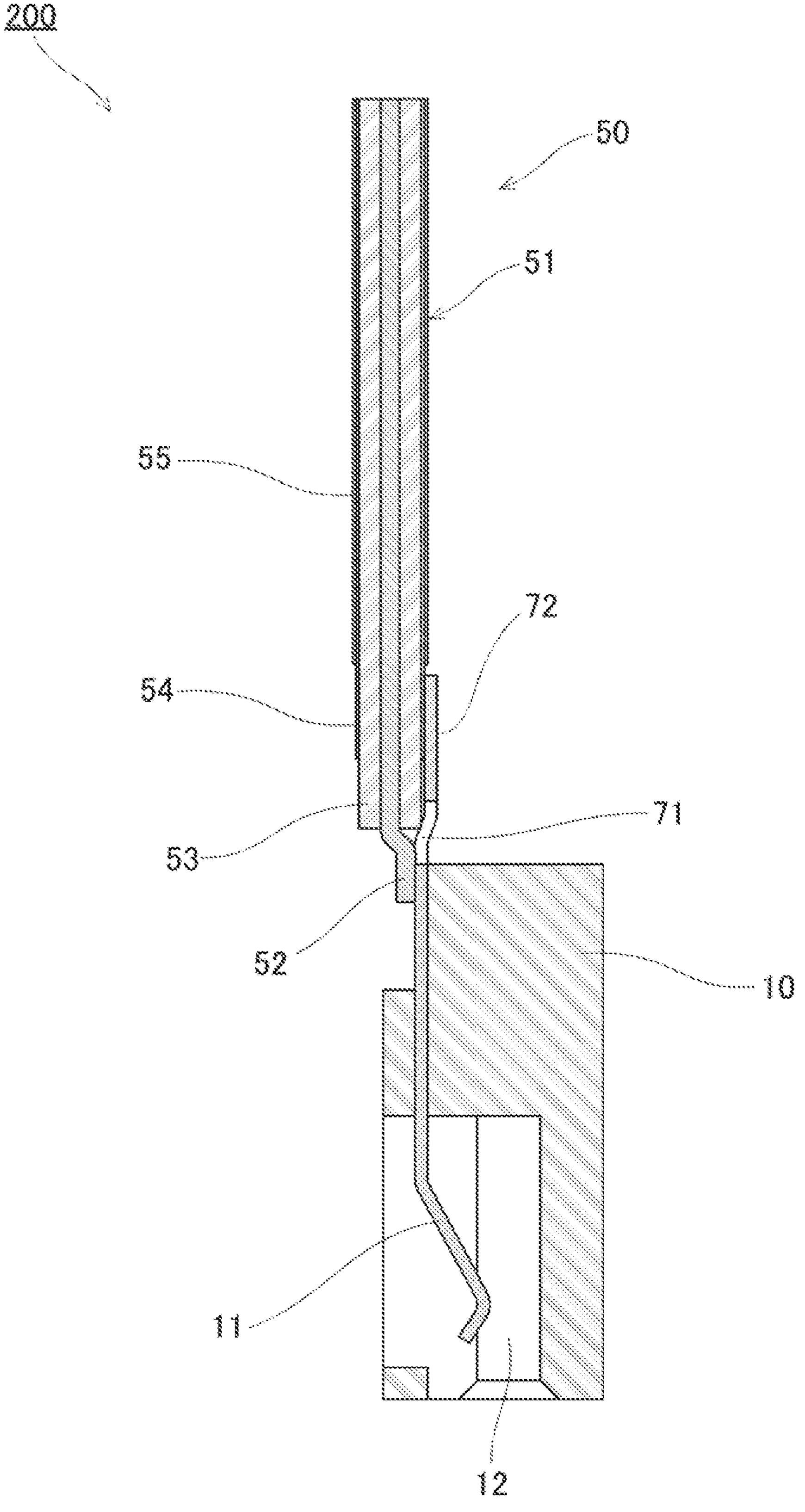
FIG. 14 is a longitudinal section taken along line 14-14 of FIG. 13.
Figure 15:
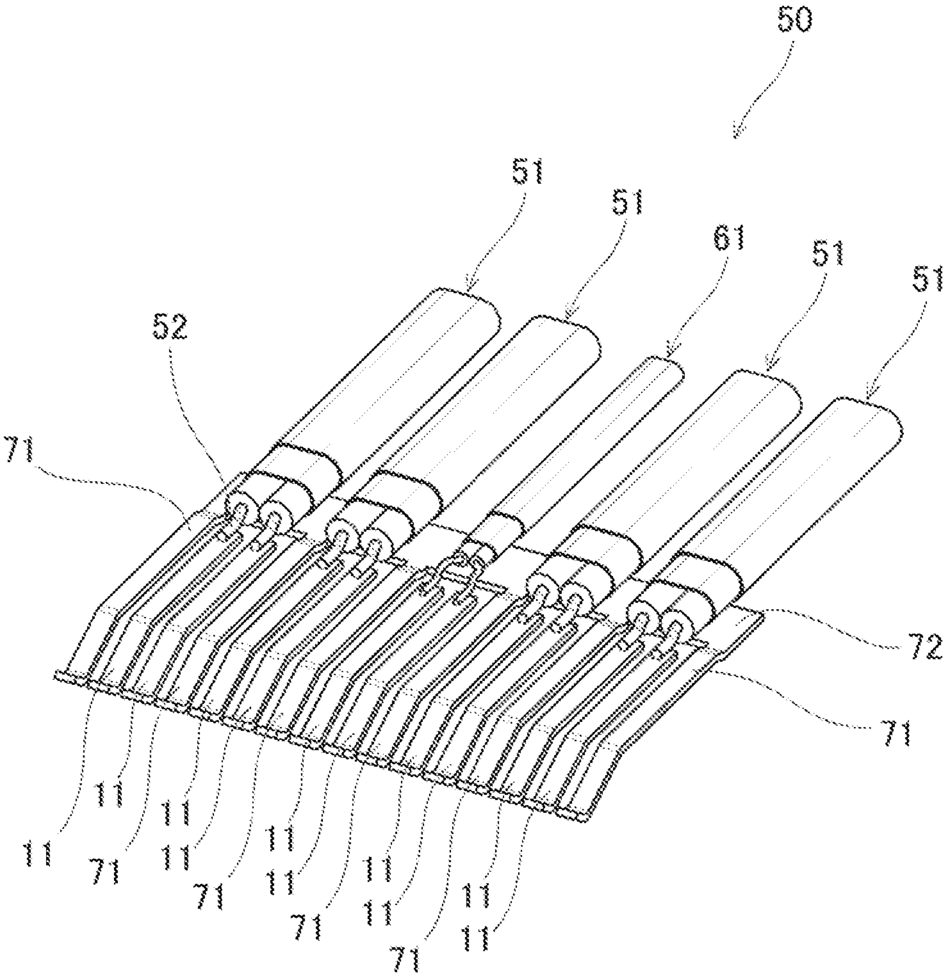
FIG. 15 is a perspective view in which only a connector housing is hidden in the connector cable according to the second embodiment illustrated in FIG. 11.

The contacts 11 and 71 serve as the ground terminals of the present invention and are formed by members made of conductive metals. As illustrated in FIGS. 13 to 15, in the second embodiment, the sixteen contacts 11 and 71 are provided. From among the sixteen contacts 11 and 71, the ten contacts 11 are connected to inner conductors 52 acting as signal lines provided for pairs of high-speed differential signal lines 51 and a pair of low-speed differential signal lines 61, the high-speed and low-speed differential signal lines serving as pair cables as will be described later. The other six contacts 71 act as ground contacts 71 provided for a ground bar 72, which will be described later, and are connected to ground conductors 54 acting as outer conductors provided for the pairs of high-speed differential signal lines 51 and the pair of low-speed differential signal lines 61, the high-speed and low-speed differential signal lines serving as pair cables as will be describe later. Furthermore, the counterpart contacts provided for a counterpart connector cable, which is not illustrated, are brought into contact with the front sides of the contacts 11 and 71 of the second embodiment while the cable array 50, which will be described later, is connected to the rear sides of the contacts 11 and 71.

Figure 16:
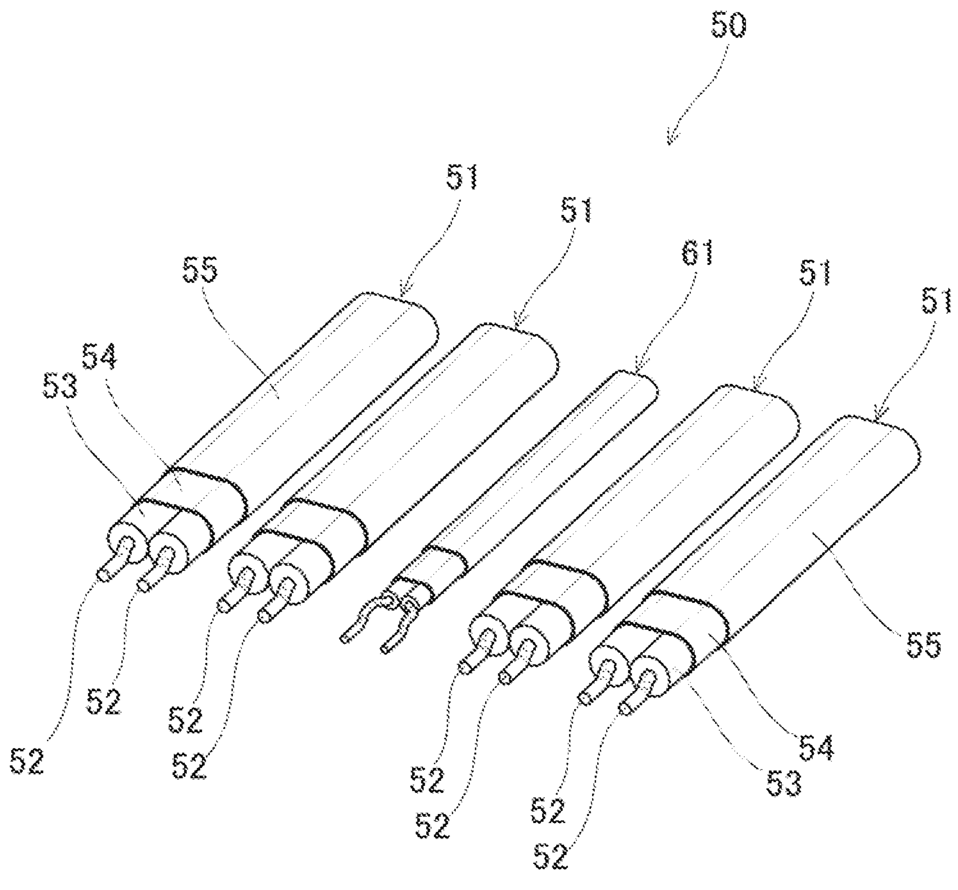
FIG. 16 is a perspective view of a cable array according to the second embodiment when the front of the cable array is viewed from the upper right.

As illustrated in FIG. 16, the cable array 50 includes four pairs of adjacent high-speed differential signal lines 51 for transmitting high-speed differential signals, and a pair of adjacent low-speed differential signal lines 61 for transmitting low-speed differential signals serving as non-high-speed differential signals. The pairs of the high-speed differential signal lines 51 and the pair of low-speed differential signal lines 61 each include the ground conductor 54 that is connected to the ground contact 71 as described above.

Figure 17:
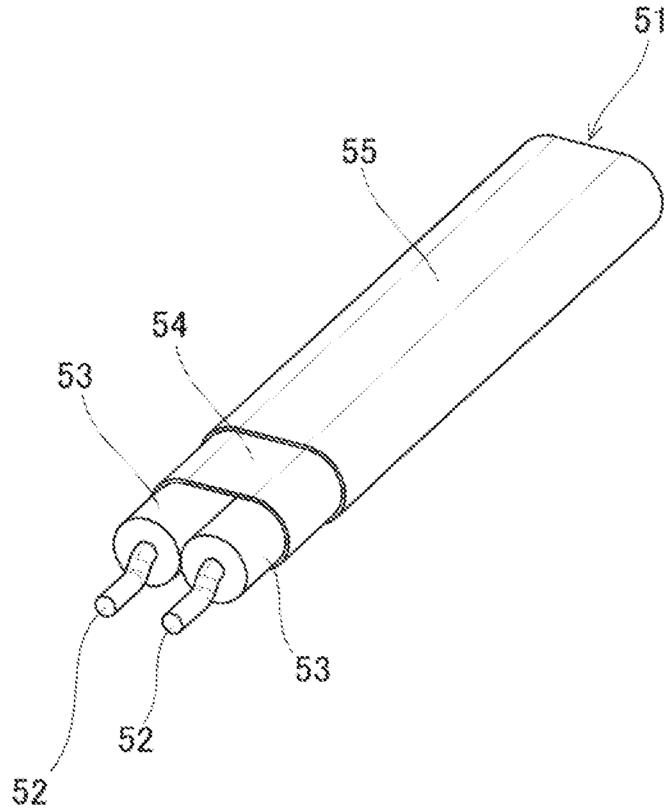
FIG. 17 is a perspective view of a pair of high-speed differential signal lines serving as a pair cable constituting the cable array according to the second embodiment when the front of the high-speed differential signal lines is viewed from the upper right.

As illustrated in FIG. 17, the pair of high-speed differential signal lines 51 is configured as a pair cable. As illustrated in FIG. 17, the pair of high-speed differential signal lines 51 includes the two inner conductors 52 acting as signal lines, first insulators 53, each covering the outer surface of the inner conductor 52, the ground conductor 54 acting as an outer conductor covering the outer surfaces of the first insulators 53, and a second insulator 55 covering the outer surface of the ground conductor 54.

The inner conductor 52 according to the second embodiment is used as a conductor for transmitting a high-speed differential signal. The first insulator 53 of the second embodiment is made of, for example, insulating materials such as polyethylene and surrounds each of the outer surfaces of the two inner conductors 52 so as to protect the inner conductor 52. The ground conductor 54 of the second embodiment is a member surrounding the outer surfaces of the two first insulators 53. The ground conductor 24 is composed of, for example, a braided wire including a netted copper wire or an aluminum foil piece. The ground conductor 54 acts as an electromagnetic shield, thereby protecting the two inner conductors 52, which transmit high-speed differential signals, from the influence of incoming electromagnetic waves or the like from the outside. The second insulator 55 of the second embodiment is disposed at the outermost surface of the pair of high-speed differential signal lines 51 configured as a pair cable, so that the second insulator 55 acts as a protective coating for the pair of high-speed differential signal lines 51 and forms the outside shape of the high-speed differential signal lines.

A differential signal can be obtained by the pair of high-speed differential signal lines 51 including the two inner conductors 52. For example, in the pair of high-speed differential signal lines 51, an original signal is transmitted to one of the inner conductors 52 while a signal in opposite phase is transmitted to the other inner conductor 52, so that the signals are balanced to obtain a differential signal. In other words, a differential signal is transmitted by using the pair of high-speed differential signal lines 51. This transmission method is resistant to noise.

The pair of low-speed differential signal lines 61 according to the second embodiment is also formed by the same configuration as the pair of high-speed differential signal lines 51 illustrated in FIG. 17. The pair of low-speed differential signal lines 61 according to the second embodiment is used for transmitting signals at lower speeds than the pair of high-speed differential signal lines 51. Thus, the low-speed differential signal lines 61 are configured as a pair cable formed with a smaller overall wire diameter than the four pairs of high-speed differential signal lines 51 of the second embodiment. In other words, in the second embodiment, the pair of low-speed differential signal lines 61 and the pair of high-speed differential signal lines 51 are configured with different appearances.

In the cable array 50 of the connector cable 200 according to the second embodiment, as illustrated in FIG. 16, the four pairs of high-speed differential signal lines 51 and the pair of low-speed differential signal lines 61 are configured such that the ground conductors 54 provided for the signal lines are fixed to the top surface of the ground bar 72 and are placed in a row. In the configuration used in the second embodiment, the ground conductors 54 of the four pairs of high-speed differential signal lines 51 provided as pair cables and the ground conductor of the pair of low-speed differential signal lines 61 are connected together.

Furthermore, the ground bar 72 has the contacts 71 serving as a plurality of ground terminals extending forward. As illustrated in, for example, FIGS. 13 and 15, the contacts 71 are formed so as to be allocated to the contacts 71 on both ends from among the sixteen contacts 11 and 71 provided for the connector cable 200 of the second embodiment, and between a pair of high-speed differential signal lines 51 and a pair of high-speed differential signal lines 51 or between a pair of high-speed differential signal lines 51 and a pair of low-speed differential signal lines 61.

As illustrated in, for example, FIGS. 15 and 16, the cable array 50 of the connector cable 200 according to the second embodiment is configured such that the number of consecutive pairs of high-speed differential signal lines 51 is limited to two by allocating the pair of low-speed differential signal lines 61 at a central position of the four pairs of the high-speed differential signal lines 51 that are placed inside the contacts 71 on both ends. With this configuration, the connector cable 200 of the second embodiment can increase the number of high-speed differential signal lines and reduce crosstalk as in the first embodiment.

It is confirmed that the connector cable 200 of the second embodiment can obtain the same effect of reducing crosstalk as the first embodiment according to analysis similar to studies conducted by the inventors as illustrated in FIGS. 8A to 8F.

Referring to FIGS. 11 to 17, the second embodiment is described as an embodiment implementable by the connector cable according to the present invention. However, the technical scope of the present invention is not limited to the scope of the second embodiment. The second embodiment can be changed or modified in various ways.

For example, the second embodiment describes an example in which the pair of low-speed differential signal lines 61 configured as a pair cable is used as non-high-speed differential signal lines for transmitting non-high-speed differential signals. The non-high-speed differential signal lines of the present invention can be configured as one or more non-high-speed differential signal lines instead of pair cables.

For example, the second embodiment describes an example in which the pair of low-speed differential signal lines 61 is used as non-high-speed differential signal lines for transmitting non-high-speed differential signals. The non-high-speed differential signal lines of the present invention may be one or more low-speed signal single ends for transmitting signals at a lower speed than the pair cable constituting a pair of high-speed differential signal lines 51.

For example, the second embodiment describes an example in which the pair of low-speed differential signal lines 61 is used as non-high-speed differential signal lines for transmitting non-high-speed differential signals. The non-high-speed differential signal lines of the present invention may be one or more power lines.

Figure 18:
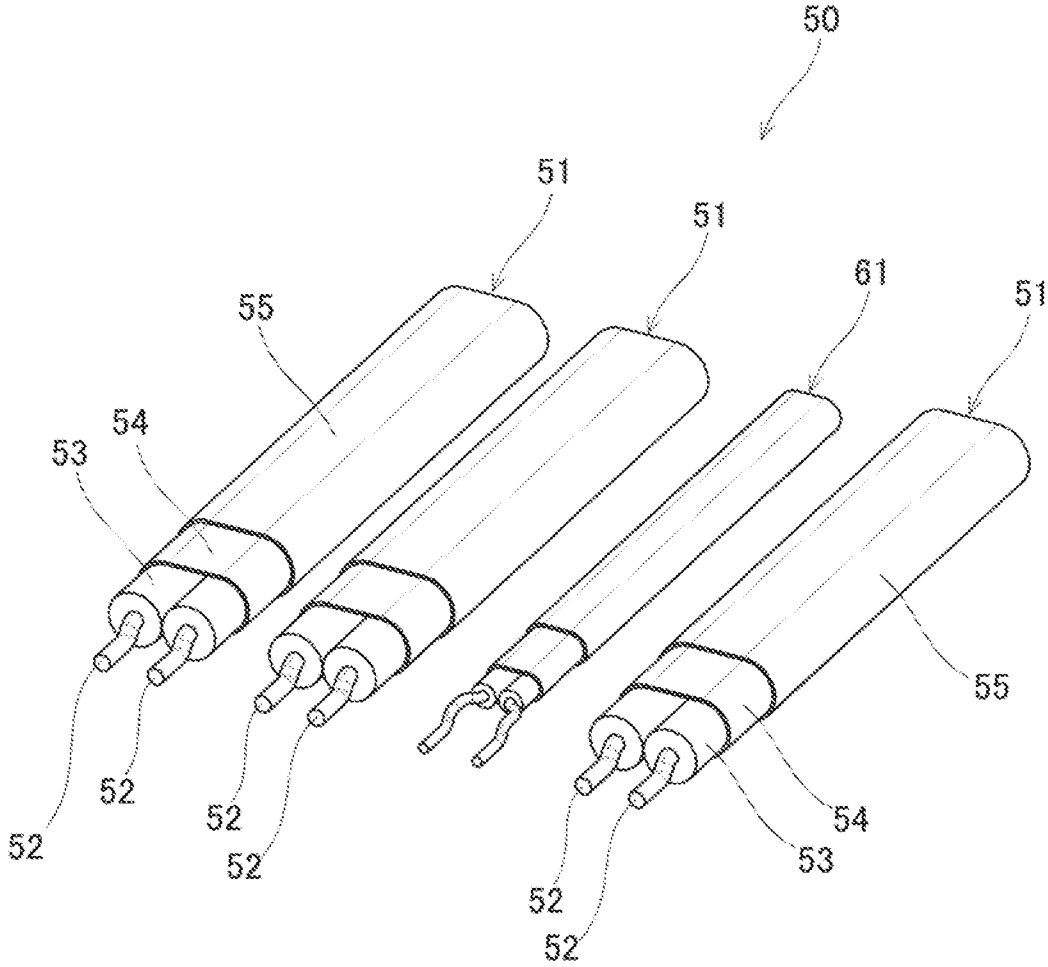
FIG. 18 illustrates a configuration example of another cable array of the second embodiment implementable by the connector cable of the present invention.
Figure 19:
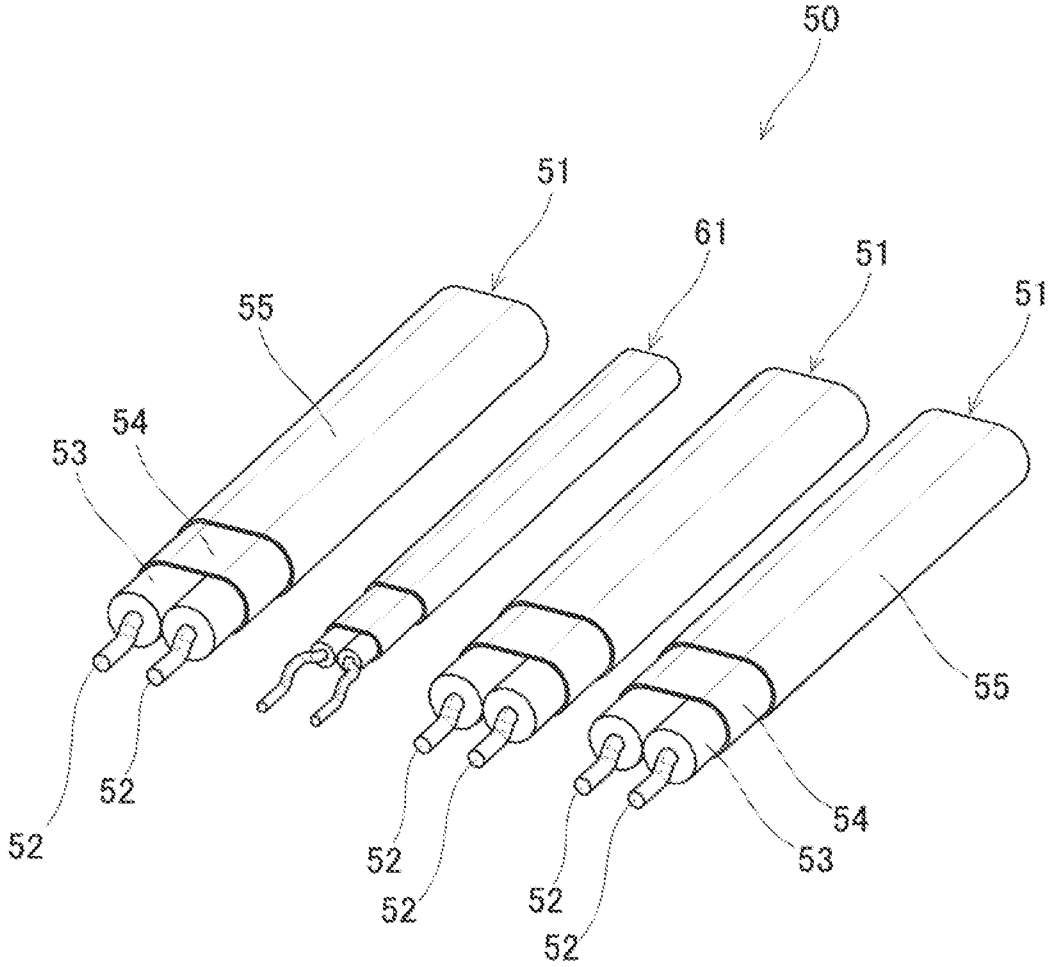
FIG. 19 illustrates a configuration example of still another cable array of the second embodiment implementable by the connector cable of the present invention.
Figure 20:
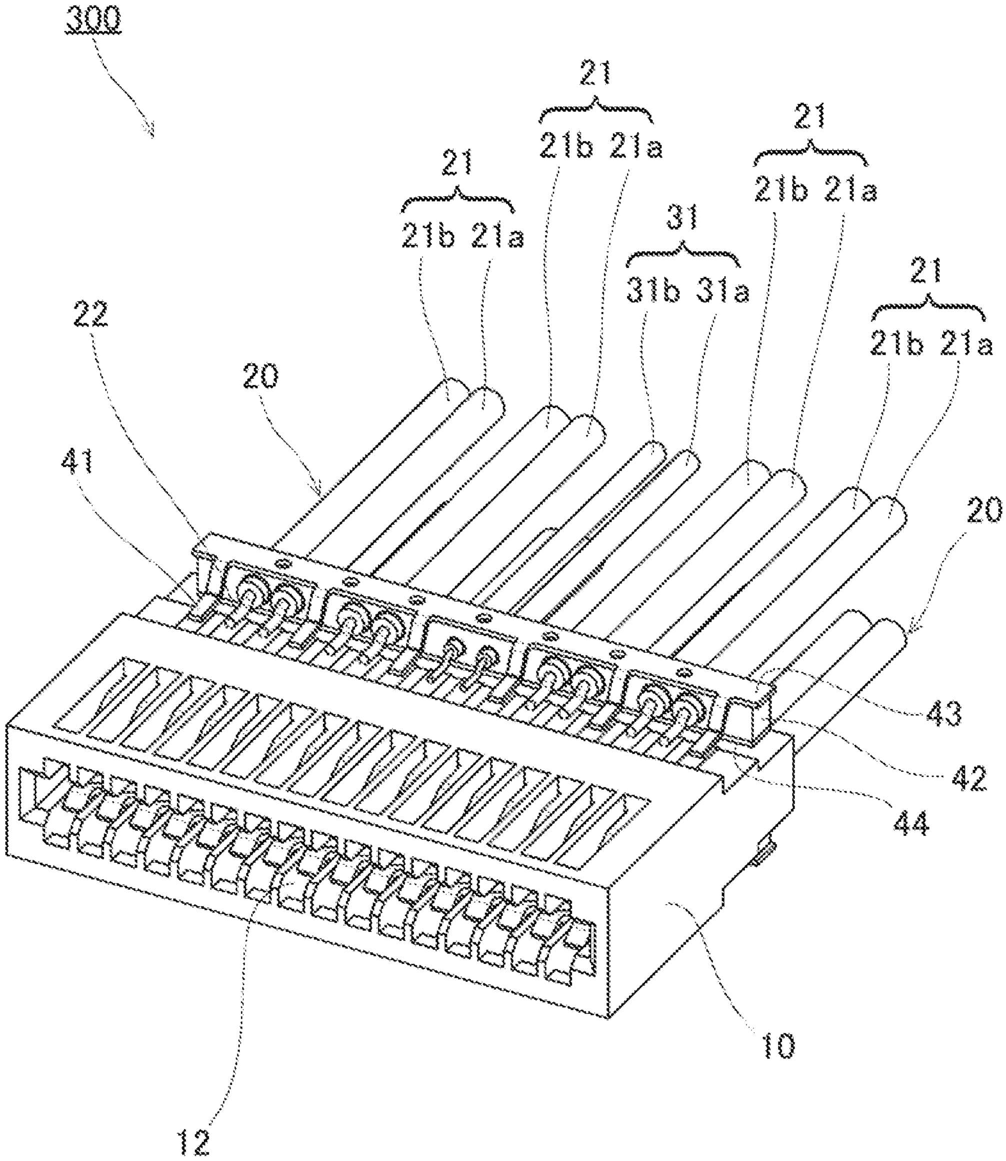
FIG. 20 is a perspective view of a connector cable according to a third embodiment when the front of the connector cable is viewed from the upper right.
Figure 21:
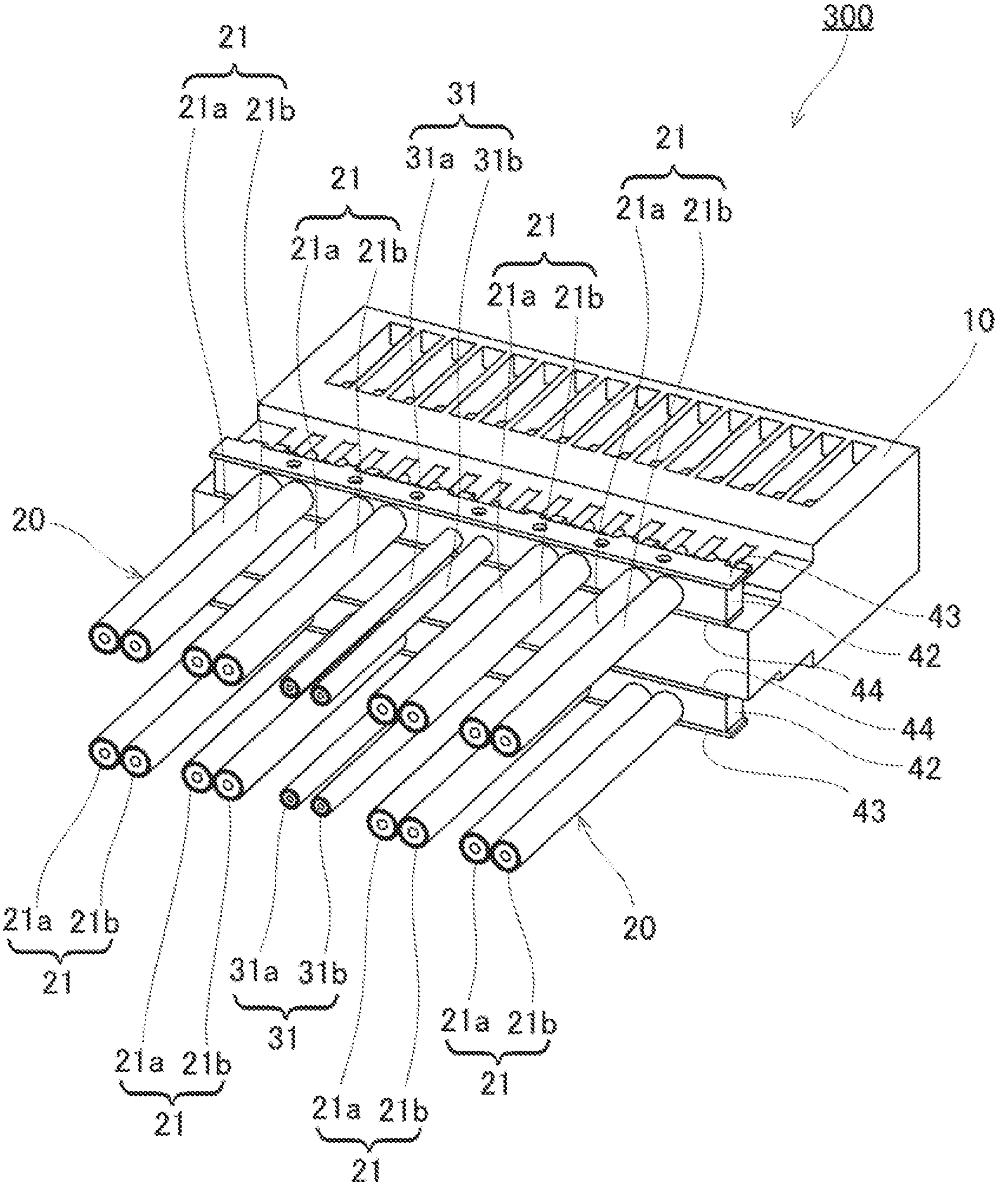
FIG. 21 is a perspective view of the connector cable according to the third embodiment when the back of the connector cable is viewed from the upper left.
Figure 22:
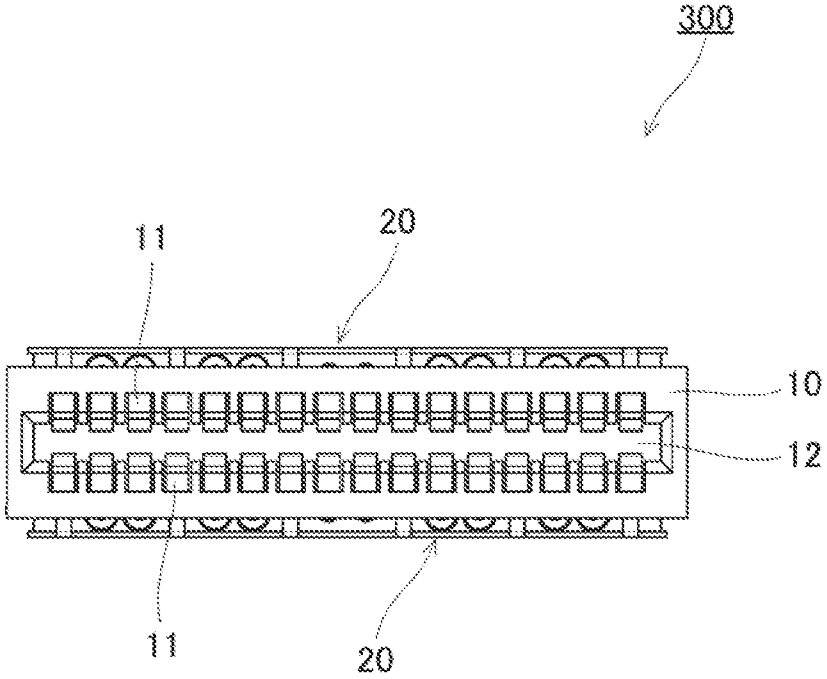
FIG. 22 is a front view of the connector cable according to the third embodiment.
Figure 23:
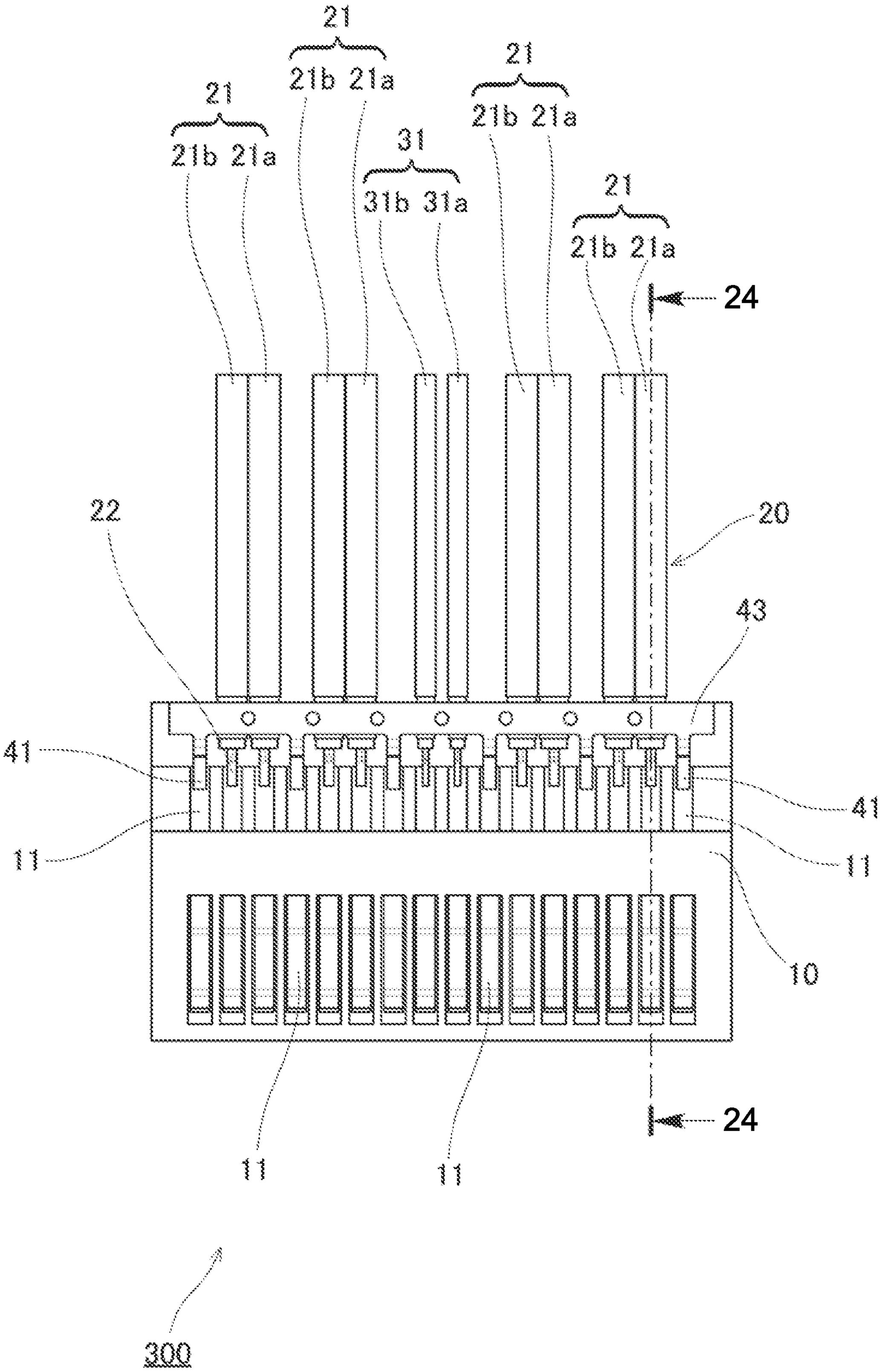
FIG. 23 is a top view of the connector cable according to the third embodiment.
Figure 24:
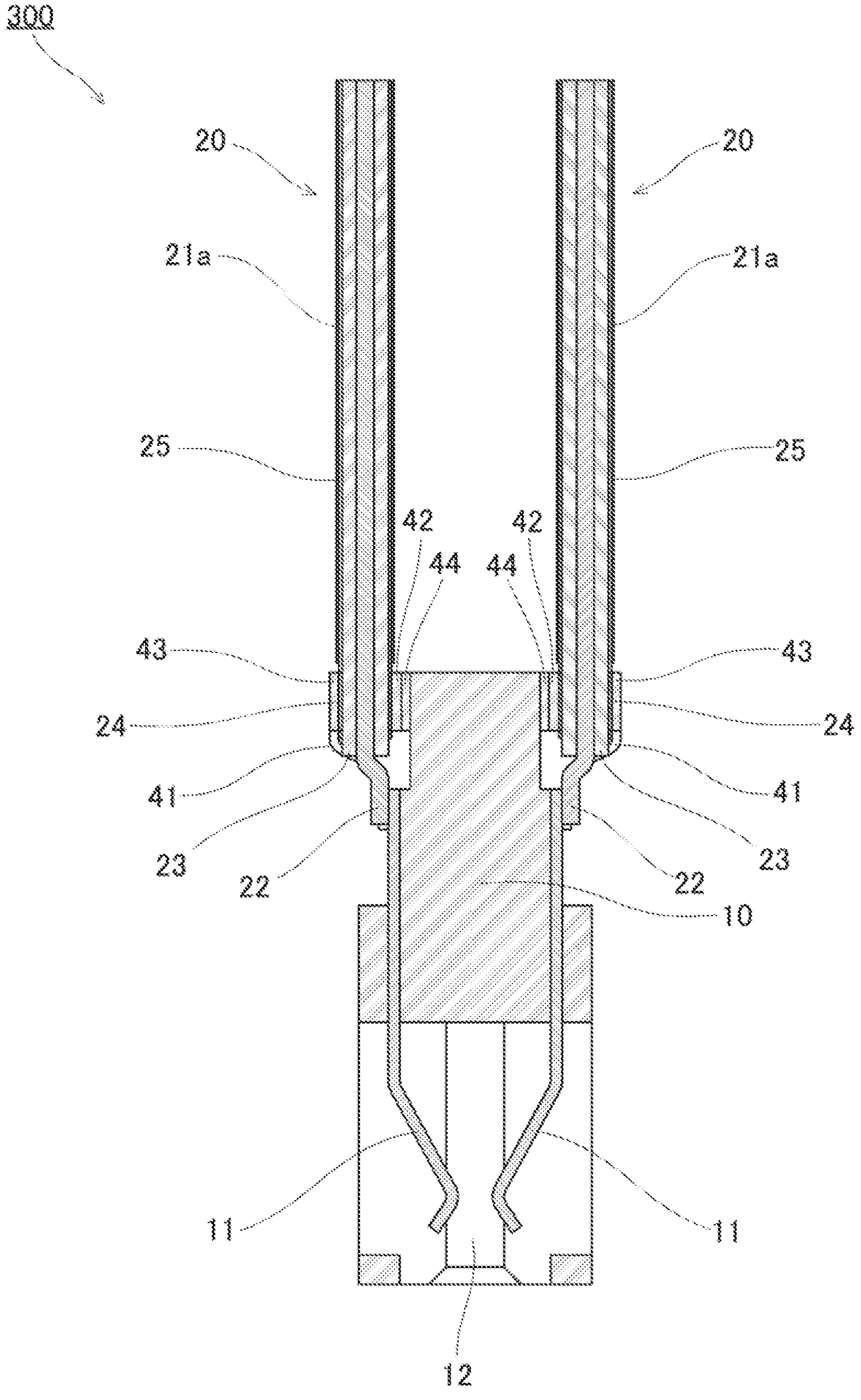
FIG. 24 is a longitudinal section taken along line 24-24 of FIG. 23.
Figure 25:
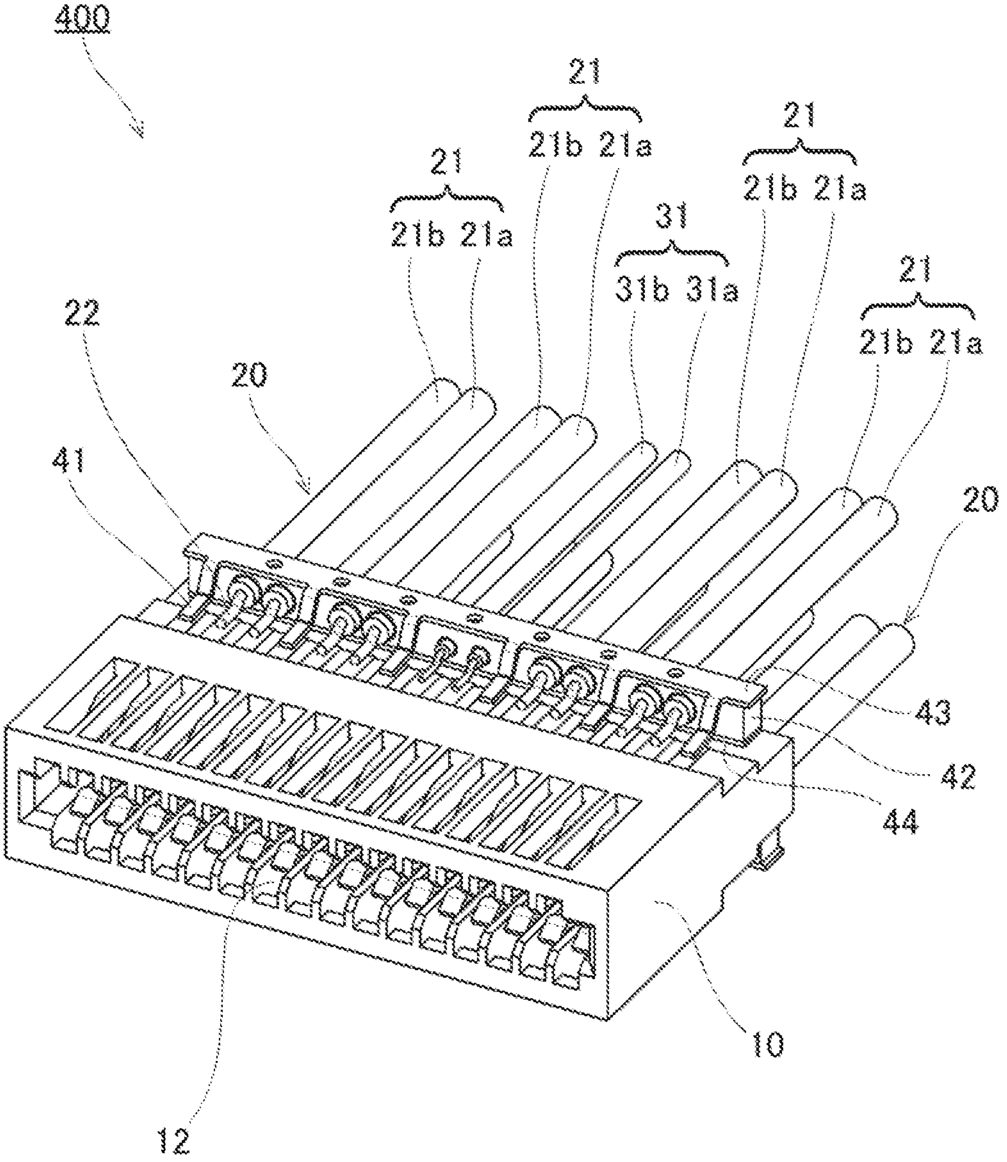
FIG. 25 is a perspective view of a connector cable according to a fourth embodiment when the front of the connector cable is viewed from the upper right.
Figure 26:
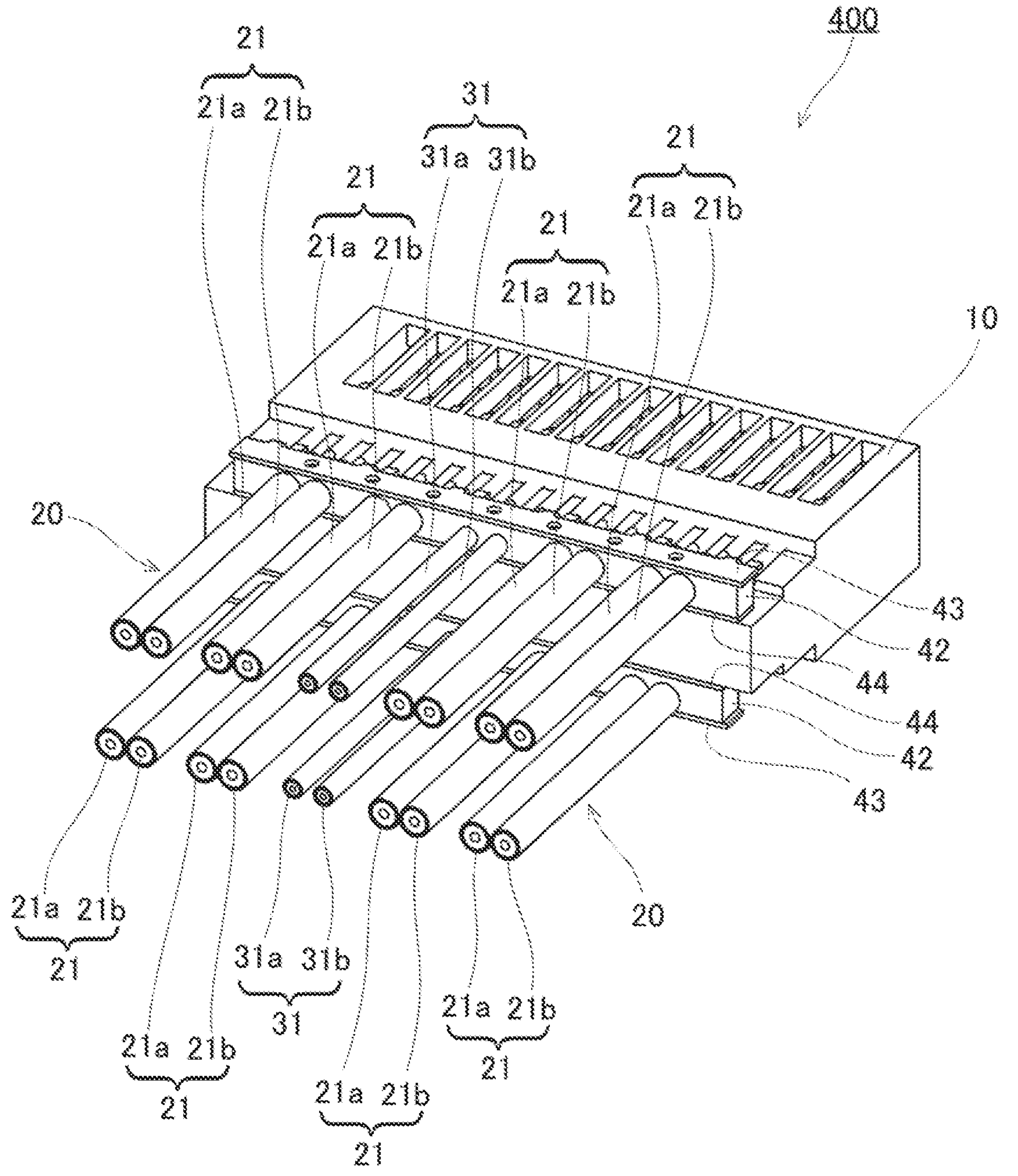
FIG. 26 is a perspective view of the connector cable according to the fourth embodiment when the back of the connector cable is viewed from the upper left.
Figure 27:
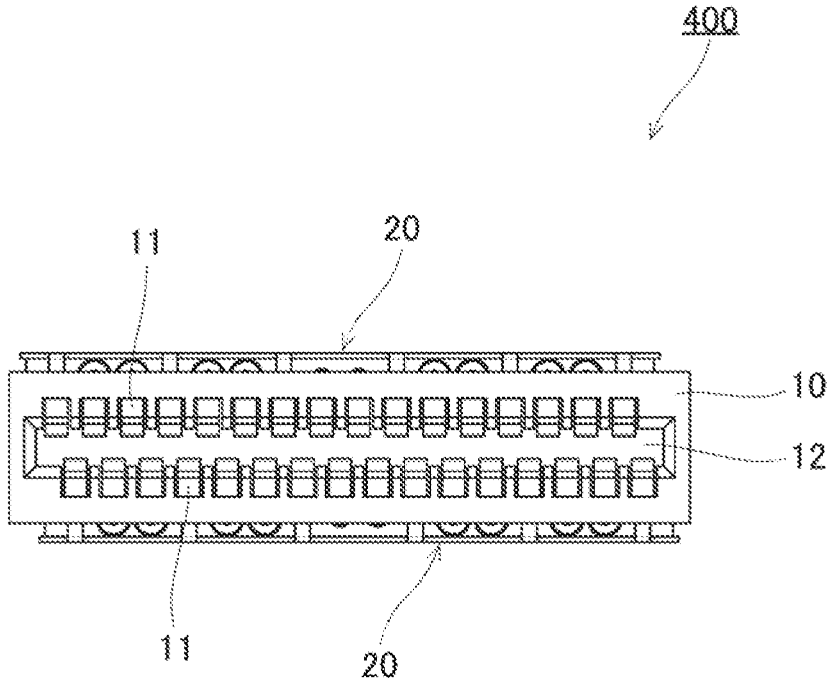
FIG. 27 is a front view of the connector cable according to the fourth embodiment.
Figure 28:
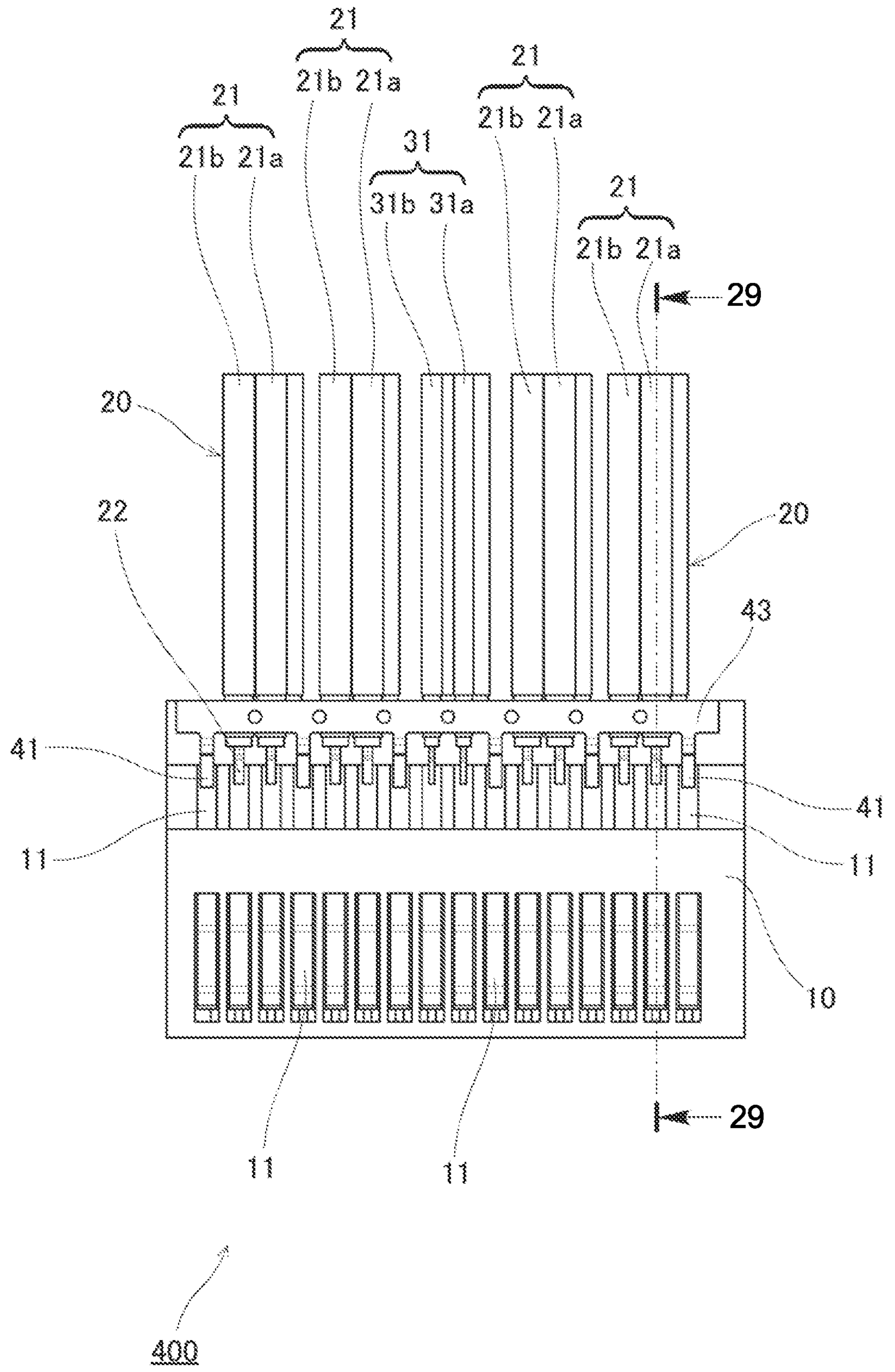
FIG. 28 is a top view of the connector cable according to the fourth embodiment.
Figure 29:
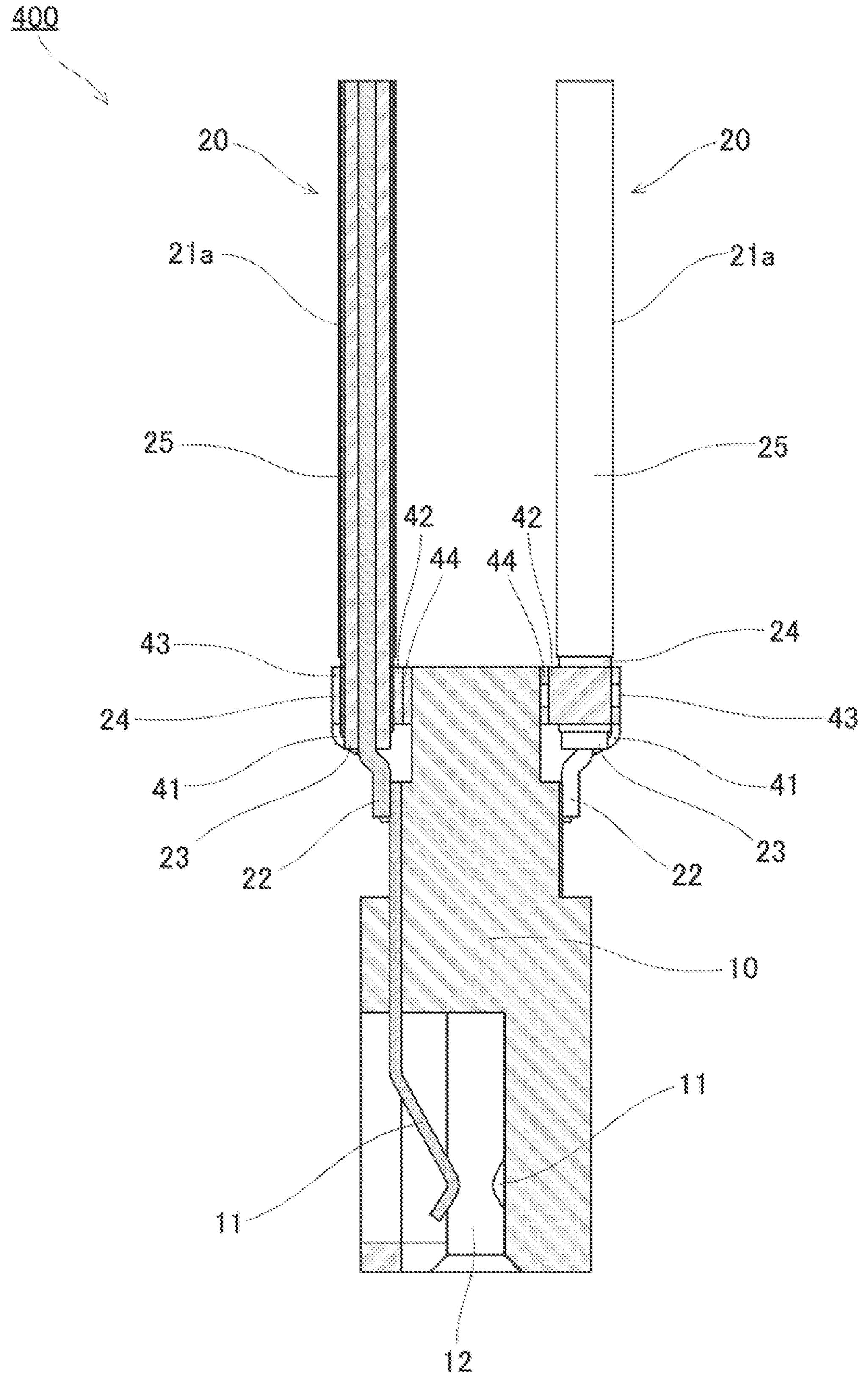
FIG. 29 is a longitudinal section taken along line 29-29 of FIG. 28.
Figure 30:
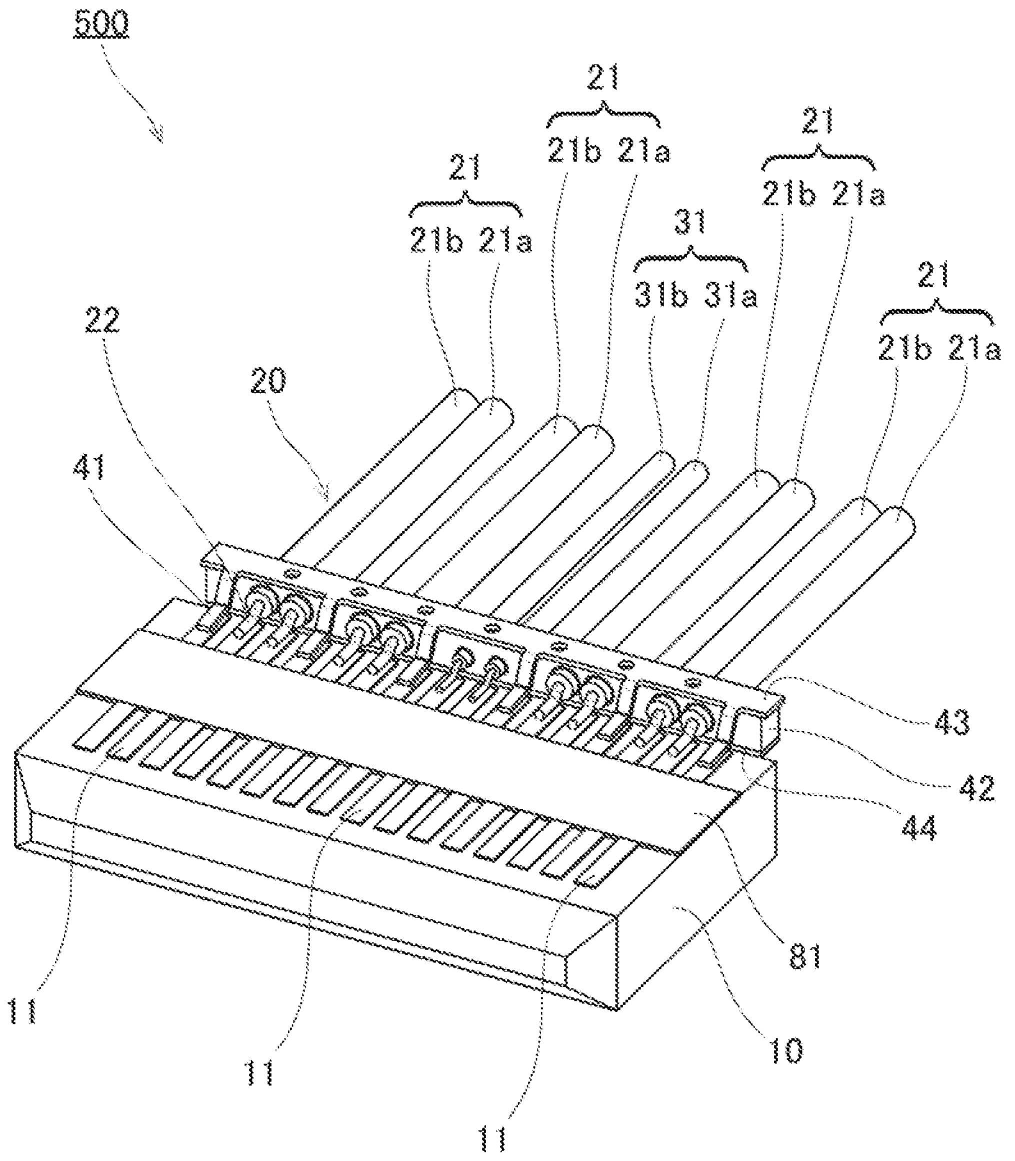
FIG. 30 is a perspective view of a connector cable according to a fifth embodiment when the front of the connector cable is viewed from the upper right.
Figure 31:
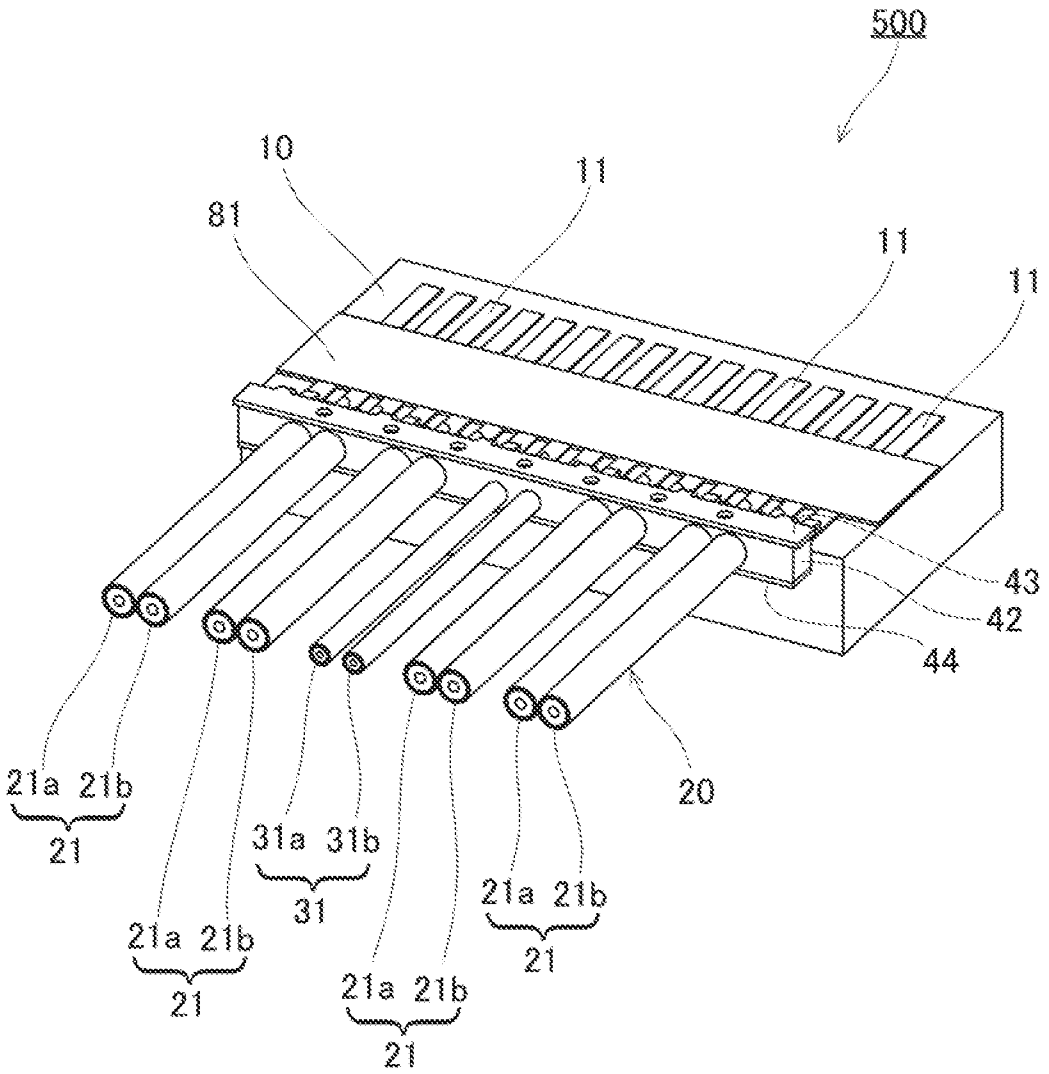
FIG. 31 is a perspective view of the connector cable according to the fifth embodiment when the back of the connector cable is viewed from the upper left.
Figure 32:
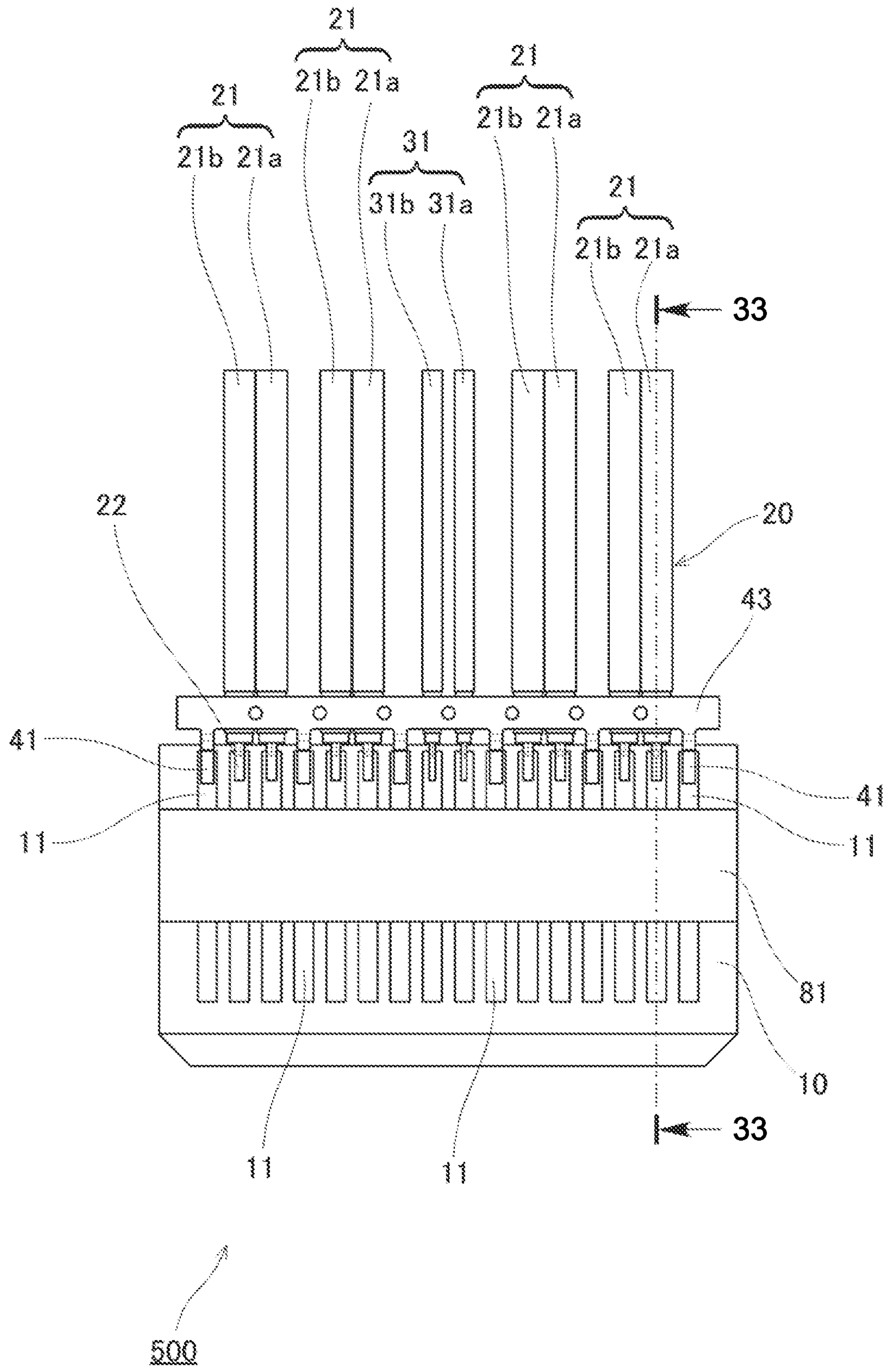
FIG. 32 is a top view of the connector cable according to the fifth embodiment.
Figure 33:
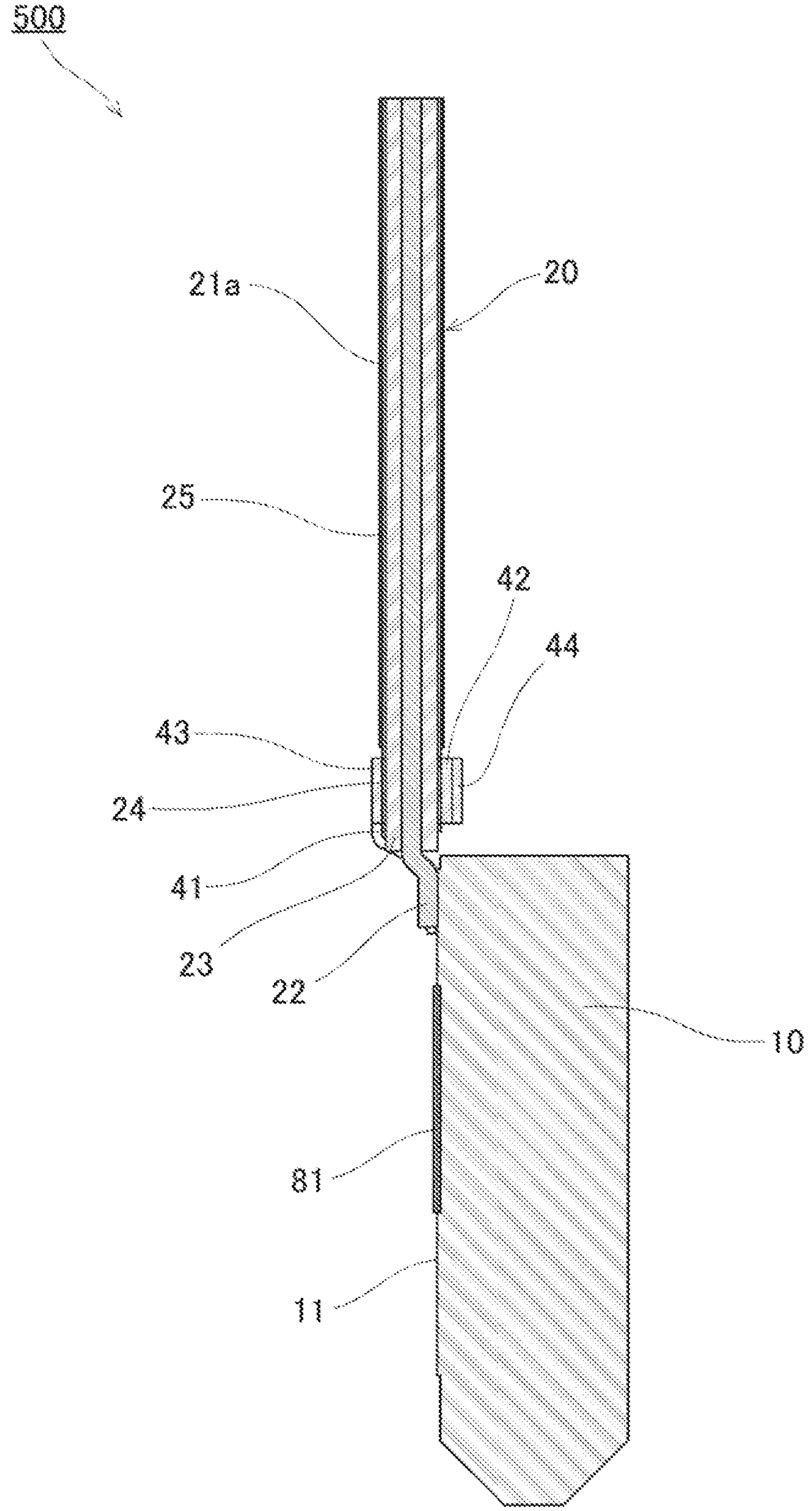
FIG. 33 is a longitudinal section taken along line 33-33 of FIG. 32.
Figure 34:
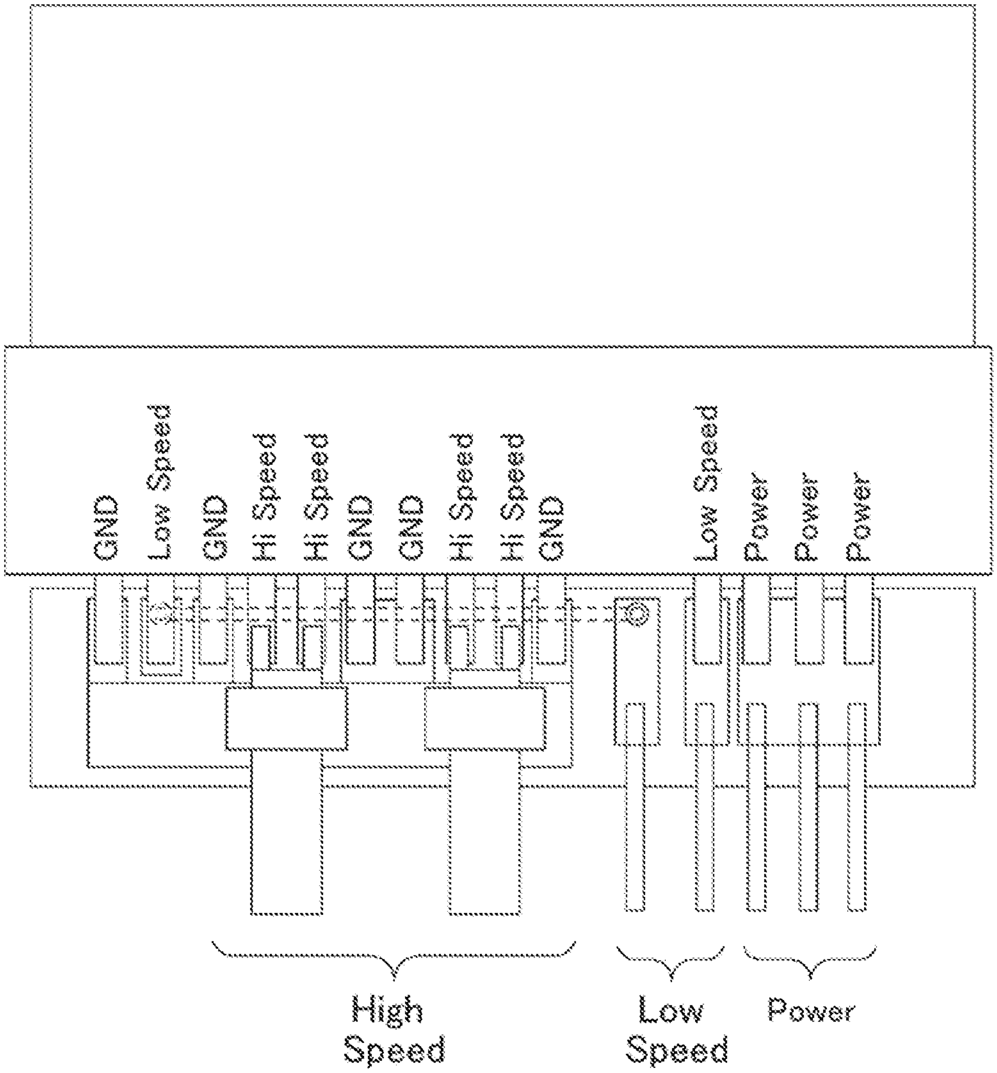
Fig.34 Prior Art
FIG. 34 illustrates a configuration example of a connector cable according to the related art.
Figure 35:
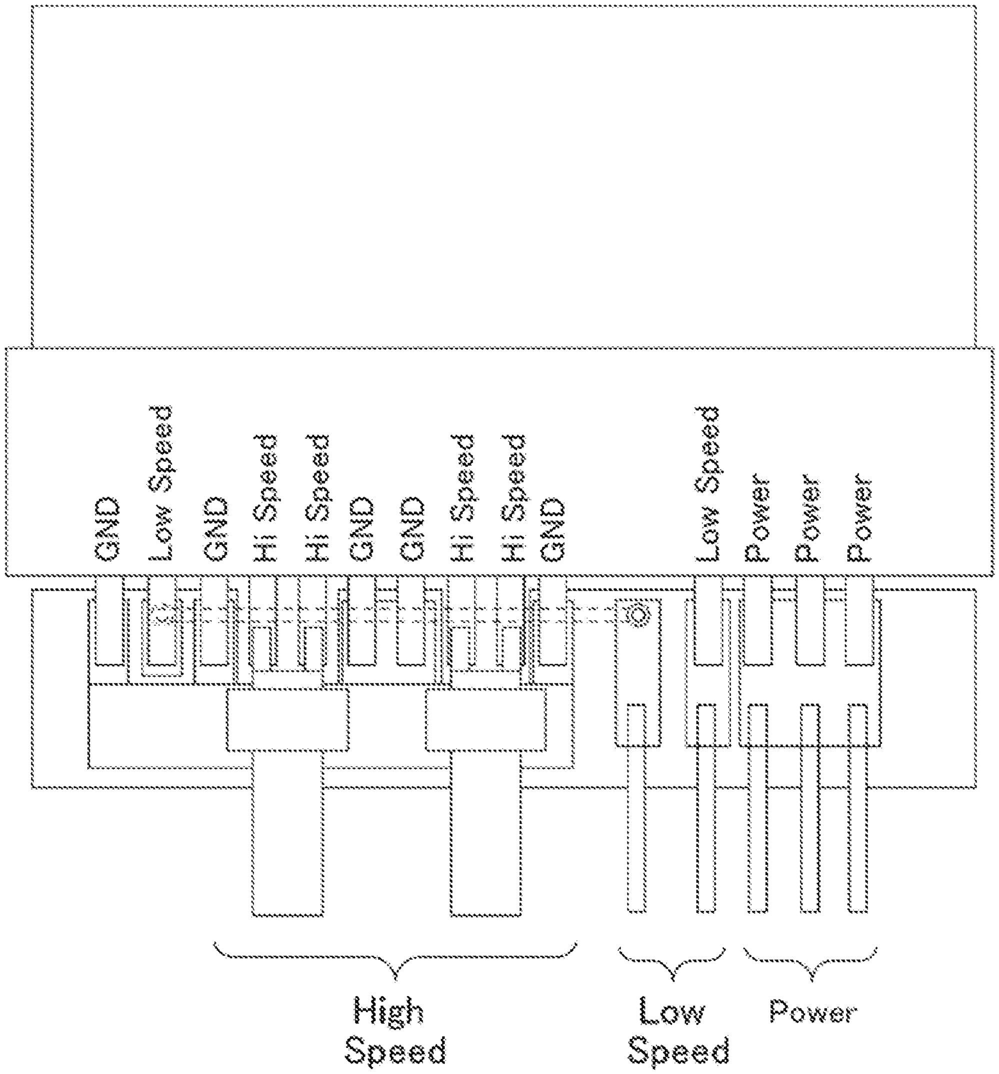
Fig.35 Prior Art
FIG. 35 illustrates another configuration example of the connector cable according to the related art.

For example, in the cable array 50 of the connector cable 200 according to the second embodiment, the number of consecutive pairs of high-speed differential signal lines 51 is limited to two by allocating the pair of low-speed differential signal lines 61 at the central position of the four pairs of high-speed differential signal lines 51. However, the connector cable of the present invention is applicable if the number of consecutive pairs of high-speed differential signal lines 51 is limited to two by allocating the pair of non-high-speed differential signal lines (the pair of low-speed differential signal lines 61) to an intermediate part of three or more pairs of high-speed differential signal lines 51 placed inside the ground contacts 71 on both ends. Thus, configurations illustrated in, for example, FIGS. 18 and 19 can achieve a connector cable with lower crosstalk than the related art. If three pairs of high-speed differential signal lines 51 and a pair of low-speed differential signal lines 61 are placed, as illustrated in a configuration example of FIG. 18, the signal lines placed inside the ground contacts 51 on both ends may include a pair of high-speed differential signal lines 51, a pair of low-speed differential signal lines 61, and two pairs of high-speed differential signal lines 51 that are placed in this order when viewed from the right side. As illustrated in a configuration example of FIG. 19, the signal lines placed inside the ground contacts 71 on both ends may include two pairs of high-speed differential signal lines 51, a pair of low-speed differential signal lines 61, and a pair of high-speed differential signal lines 51 that are placed in this order when viewed from the right side.

Third Embodiment

Referring to FIGS. 20 to 24, a connector cable 300 according to a third embodiment will be described below.

As illustrated in FIGS. 20 to 24, the connector cable 300 of the third embodiment is configured such that the two connector cables 100 of the first embodiment are prepared and the two connector cables 100 are symmetrically placed in the vertical direction. The connector cable 300 of the third embodiment includes a configuration in which a plurality of contacts 11 are placed in a row. Thus, cable arrays 20 that are used for the connector cable 300 and are symmetrically placed in the vertical direction are included in the scope of the present invention. Also in the connector cable 300 of the third embodiment configured such that the two cable arrays 20 are symmetrically placed in the vertical direction, the effect of increasing the number of high-speed differential signal lines and reducing crosstalk can be obtained as in the connector cables 100 and 200 according to the first and second embodiments.

Fourth Embodiment

Referring to FIGS. 25 to 29, a connector cable 400 according to a fourth embodiment will be described below.

As illustrated in FIGS. 25 to 29, the connector cable 400 of the fourth embodiment is configured such that the two connector cables 100 of the first embodiment are prepared and the two connector cables 100 are vertically placed while being slightly displaced from each other in the horizontal direction, that is, a plurality of contacts 11 are vertically placed in a staggered arrangement. The connector cable 400 of the fourth embodiment includes a configuration in which the contacts 11 are placed in a row. Thus, two cable arrays 20 that are used for the connector cable 400 are included in the scope of the present invention. Also in the connector cable 400 of the fourth embodiment configured such that the contacts 11 of the two cable arrays 20 are vertically placed in a staggered arrangement, the effect of increasing the number of high-speed differential signal lines and reducing crosstalk can be obtained as in the connector cables 100, 200, and 300 according to the first to third embodiments.

Fifth Embodiment

Referring to FIGS. 30 to 33, a connector cable 500 according to a fifth embodiment will be described below.

As illustrated in FIGS. 30 to 33, the connector cable 500 of the fifth embodiment is configured such that the cable array 20 of the first embodiment is connected to a plurality of contacts 11 placed on a connector housing 10, via a paddle card 81 provided as a printed board. The connector cable 500 of the fifth embodiment is advantageous in that the structure of the connector cable can be simplified by using the paddle card 81 and the function and performance can be easily adjusted by mounting other components on the paddle card 81. The connector cable 500 of the fifth embodiment illustrated in FIGS. 30 to 33 includes a configuration in which the contacts 11 are placed in a row. Thus, the cable array 20 used for the connector cable 500 is included in the scope of the present invention. Also in the connector cable 500 of the fifth embodiment, the effect of increasing the number of high-speed differential signal lines and reducing crosstalk can be obtained as in the connector cables 100, 200, 300, and 400 according to the first to fourth embodiments.

Referring to FIGS. 1 to 33, the connector cables 100, 200, 300, 400, and 500 according to the first to fifth embodiments are described as a variety of embodiments implementable by the present invention. By combining the embodiments in various ways, the scope of application of the connector cable according to the present invention can be extended. For example, the connector cable of the present invention may include a contact (e.g., a power supply terminal to which a power line is allocated), to which another non-high-speed differential signal line different from the foregoing non-high-speed differential signal lines (a pair of low-speed differential signal lines 31, a pair of low-speed differential signal lines 61) is allocated, outside the ground terminals 41 allocated to the contacts on both ends of the cable arrays 20 and 50 according to the first to fifth embodiments.

The present invention relates to a connector cable including a plurality of contacts placed in a row, the contacts being connected to a plurality of cables. The present invention is particularly useful for a connector cable that transmits a high-speed differential signal.

REFERENCE SIGNS LIST

100 Connector cable (first embodiment)
200 Connector cable (second embodiment)
300 Connector cable (third embodiment)
400 Connector cable (fourth embodiment)
500 Connector cable (fifth embodiment)
10 Connector housing
11 Contact
12 Fitting hole
20 Cable array (a plurality of cables) (first and third to fifth embodiments)
21 Pair of high-speed differential signal lines
21*a*, 21*b* High-speed differential signal lines
22 Inner conductor (signal line)
23 First insulator
24 Ground conductor (outer conductor)
25 Second insulator
31 Pair of low-speed differential signal lines (pair of non-high-speed differential signal lines)
31*a*, 31*b* Low-speed differential signal lines (non-high-speed differential signal lines)
41 Ground terminal
42 Solder block
43 Upper ground bar
44 Lower ground bar
50 Cable array (a plurality of cables) (second embodiment)
51 Pair of high-speed differential signal lines
52 Inner conductor (signal line)
53 First insulator
54 Ground conductor (outer conductor)
55 Second insulator
61 Pair of low-speed differential signal lines (pair of non-high-speed differential signal lines)
71 (Ground) contact (ground terminal)
72 Ground bar
81 Paddle card (printed board)

What is claimed is:

1. A connector cable comprising:

a plurality of contacts placed in a row;

a plurality of cables connected to the plurality of contacts, the plurality of cables including a high-speed differential signal line portion including at least three pairs of high-speed differential signal lines, arranged adjacent to each other and transmitting high-speed differential signals, and a non-high-speed differential signal line portion including one or two non-high-speed differential signal lines or one pair or two pairs of non-high-speed differential signal lines, arranged between two pairs of the at least three pairs of high-speed differential signal lines and transmitting non-high-speed differential signals;

a solder block fixing the plurality of cables;

a ground bar including a pair of bars arranged on and under the solder block; and a plurality of ground terminals extending from the ground bar, and arranged to be allocated to contacts on both ends among the plurality of contacts, and a contact between two pairs of the at least three pairs of high-speed differential signal lines and between one pair of the at least three pairs of high-speed differential signal lines and the non-high-speed differential signal line portion, wherein the non-high-speed differential signal line portion is arranged among the high-speed differential signal line portion inside the plurality of ground terminals arranged to be allocated to the contacts on both ends such that the at least three pairs of high-speed differential signal lines are consecutively arranged up to two pairs, each of the plurality of cables includes an inner conductor, a first insulator covering the inner conductor, and an outer conductor covering the first insulator, outer conductors of the plurality of cables are fixed through the solder block, and each of the pair of bars is one plate-shaped member extending in a direction of the plurality of contacts placed in the row, and the outer conductors of the plurality of cables are collectively connected through the pair of bars.

2. The connector cable according to claim 1, wherein the one pair or two pairs of non-high-speed differential signal lines include one pair or two pairs of differential signal lines arranged adjacent to each other and transmitting the non-high-speed differential signals at a speed lower than that of the at least three pairs of high-speed differential signal lines.

3. The connector cable according to claim 1, wherein the one or two non-high-speed differential signal lines are one or two low-speed signal single ends transmitting the non-high-speed differential signals at a speed lower than that of the at least three pairs of high-speed differential signal lines.

4. The connector cable according to claim 1, wherein the one or two non-high-speed differential signal lines are one or two power lines.

5. The connector cable according to claim 1, wherein the one or two non-high-speed differential signal lines and the one pair or two pairs of non-high-speed differential signal lines have appearances different from the at least three pairs of high-speed differential signal lines.

6. The connector cable according to claim 1, further comprising another non-high-speed differential signal line different from the non-high-speed differential signal line portion, and another contact to which the another non-high-speed differential signal line is allocated, arranged outside the plurality of ground terminals allocated to the contacts on both ends.

7. The connector cable according to claim 1, wherein the high-speed differential signal line portion includes three pairs of high-speed differential signal lines, and the non-high-speed differential signal line portion includes two lines or one pair of non-high-speed differential signal lines arranged between two pairs of the three pairs of high-speed differential signal lines.

8. The connector cable according to claim 1, wherein the plurality of ground terminals outwardly extends from one of the pair of bars arranged on the solder block, each of the pair of bars continuously extends between two of the plurality of ground terminals arranged to be allocated to the contacts on both ends among the plurality of contacts, and each of the plurality of cables further includes a second insulator covering the outer conductor, as a protective coating, and the outer conductor is exposed in the solder block between the pair of bars.

9. The connector cable according to claim 8, further comprising a connector housing in which the plurality of contacts is placed in the row, wherein the connector housing includes a front portion having a fitting hole at a front side and a plurality of slits on a top side, the fitting hole and the plurality of slits being interconnected inside the front portion, and front ends of the plurality of contacts being positioned thereinside, and a rear portion having a first portion on which the plurality of cables is connected to rear ends of the plurality of contacts and a second portion through which the plurality of contacts extends toward the fitting hole.

10. A connector cable comprising:

a plurality of contacts placed in a row;

a plurality of cables connected to the plurality of contacts, the plurality of cables including a high-speed differential signal line portion including at least three pairs of high-speed differential signal lines, arranged adjacent to each other and transmitting high-speed differential signals, and a power line portion including one or two power lines, arranged between two pairs of the at least three pairs of high-speed differential signal lines and supplying power;

a solder block fixing the plurality of cables;

a ground bar including a pair of bars arranged on and under the solder block; and a plurality of ground terminals extending from the ground bar, and arranged to be allocated to contacts on both ends among the plurality of contacts, and a contact between two pairs of the at least three pairs of high-speed differential signal lines and between one pair of the at least three pairs of high-speed differential signal lines and the power line portion, wherein the power line portion is arranged among the high-speed differential signal line portion inside the plurality of ground terminals arranged to be allocated to the contacts on both ends such that the at least three pairs of high-speed differential signal lines are consecutively arranged up to two pairs, each of the plurality of cables includes an inner conductor, a first insulator covering the inner conductor, and an outer conductor covering the first insulator, outer conductors of the plurality of cables are fixed through the solder block, and each of the pair of bars is one plate-shaped member extending in a direction of the plurality of contacts placed in the row, and the outer conductors of the plurality of cables are collectively connected through the pair of bars.

11. The connector cable according to claim 10, wherein the plurality of ground terminals outwardly extends from one of the pair of bars arranged on the solder block, each of the pair of bars continuously extends between two of the plurality of ground terminals arranged to be allocated to the contacts on both ends among the plurality of contacts, and each of the plurality of cables further includes a second insulator covering the outer conductor, as a protective coating, and the outer conductor is exposed in the solder block between the pair of bars.

12. The connector cable according to claim 11, further comprising a connector housing in which the plurality of contacts is placed in the row, wherein the connector housing includes a front portion having a fitting hole at a front side and a plurality of slits on a top side, the fitting hole and the plurality of slits being interconnected inside the front portion, and front ends of the plurality of contacts being positioned thereinside, and a rear portion having a first portion on which the plurality of cables is connected to rear ends of the plurality of contacts and a second portion through which the plurality of contacts extends toward the fitting hole.

13. A connector cable comprising:

a plurality of contacts placed in a row;

a plurality of cables connected to the plurality of contacts, the plurality of cables including a high-speed differential signal line portion including at least three pairs of high-speed differential signal lines, arranged adjacent to each other and transmitting high-speed differential signals, and a power line portion including one or two power lines, arranged between two pairs of the at least three pairs of high-speed differential signal lines and supplying power;

a ground bar arranged under the plurality of cables; and a plurality of ground terminals extending from the ground bar, and arranged to be allocated to contacts on both ends among the plurality of contacts and a contact between two pairs of the at least three pairs of high-speed differential signal lines and between one pair of the at least three pairs of high-speed differential signal lines and the power line portion, wherein the power line portion is arranged among the high-speed differential signal line portion inside the plurality of ground terminals arranged to be allocated to the contacts on both ends such that the at least three pairs of high-speed differential signal lines are consecutively arranged up to two pairs, each of the plurality of cables includes an inner conductor, a first insulator covering the inner conductor, and an outer conductor covering the first insulator, and the ground bar is one plate-shaped member arranged under outer conductors of the plurality of cables and extending in a direction of the plurality of contacts placed in the row, and the outer conductors of the plurality of cables are collectively connected through the ground bar.

* * * * *